US012694198B2

(12) United States Patent (10) Patent No.: US 12,694,198 B2
Roybal et al. (45) Date of Patent: Jul. 28, 2026

(54) MODEL CREATION AND MANAGEMENT USING A MODEL MANAGEMENT SERVICE

(71) Applicant: AT&T Intellectual Property I, L.P., Atlanta, GA (US)

(72) Inventors: Michael Roybal, Woodinville, WA (US); Matthew Heyer, Saint George, UT (US); Wilson Huang, Pleasanton, CA (US)

(73) Assignee: AT&T Intellectual Property I, I.P., Atlanta, GA (US)

( * ) Notice: Subject to any disclaimer, the term of this patent is extended or adjusted under 35 U.S.C. 154(b) by 108 days.

(21) Appl. No.: 18/588,979

(22) Filed: Feb. 27, 2024

(65) Prior Publication Data

US 2025/0272473 A1 Aug. 28, 2025

(51) Int. Cl.
*G06F 16/30* (2019.01)
*G06F 40/117* (2020.01)
*G06F 40/197* (2020.01)

(52) U.S. Cl.
CPC .......... *G06F 40/117* (2020.01); *G06F 40/197* (2020.01)

(58) Field of Classification Search
CPC ............................ G06F 40/117; G06F 40/197
See application file for complete search history.

(56) References Cited

U.S. PATENT DOCUMENTS

| | | | |
|---|---|---|---|
| 2016/0063422 A1* | 3/2016 | Chen | ................... G06Q 10/067 |
| | | | 705/7.26 |
| 2021/0056083 A1* | 2/2021 | Lisuk | ...................... G06F 16/13 |
| 2024/0134682 A1* | 4/2024 | Kulkarni | ............... G06N 20/10 |
| 2024/0211805 A1* | 6/2024 | Siracusa | ............ G06F 18/2431 |
| 2024/0320116 A1* | 9/2024 | Katti | .................. G06F 11/3072 |

* cited by examiner

*Primary Examiner* — Khanh B Pham
(74) *Attorney, Agent, or Firm* — Hartman & Citrin LLC

(57) ABSTRACT

Model creation and management using a model management service can include obtaining model management data that comprises modeling data that defines a project to model, the project including a network flow, a network system, a device, or a process; detecting, in the model management data, a selection of a template to apply to the project to generate the model; and creating, based on the model management data and the template, the model. The model can include a directory, a data structure, and a diagram that describes the project. The model can be converted into a device-agnostic format version of the model and loaded to a data storage resource as model data that can include the device-agnostic format version of the model.

20 Claims, 20 Drawing Sheets

300B

START

302B
AUTHENTICATE A USER OR DEVICE

304B
DETECT REQUEST FOR AND PROVIDE
CODE TO THE USER DEVICE

306B
TRIGGER DELIVERY OF
SCRIPTS FOR EXECUTION

308B
OBTAIN MODEL MANAGEMENT DATA

310B
CREATE MODEL (DIRECTORIES,
STRUCTURES, AND DIAGRAMS)

312B
LOAD MODEL TO COMMON
REPOSITORY

314B
END

400

START

402
DETECT MODEL UPDATE EVENT

404
UPDATE THE MODEL BASED
ON THE DETECTED EVENT

406
PROPAGATE UPDATES TO THE MODEL

408
STORE UPDATED MODEL AND
UPDATED MODEL HISTORY

410
END

500

START

502
RECEIVE A REQUEST FOR A
MODEL HISTORY VIEW

504
OBTAIN MODEL DATA RELATING TO
REQUESTED MODEL HISTORY VIEW

506
GENERATE MODEL HISTORY VIEW

508
ENABLE INTERACTION WITH MODEL
HISTORY VIEW

510
END

700G

| USER<br>DEVICE<br>102 | MAP | SESSION | SUMMARIZE<br>AI | CHAT<br>GPT<br>MODEL | SHARE<br>POINT | AZURE<br>EVENT<br>HUB |
|---|---|---|---|---|---|---|

Publish model to MAP()

Narration session scheduled()

Session takes place()

Extract Transcript()

Return()

Submit to AI summary()

End user asks questions on summarize AI()

End user saves the word document summary locally()

Object is pushed to Event Hub (MMS 110)()

To Sharepoint()

End user modifies document with added multimedia references and content()

User adds content to a lightweight publication process()

Open CSV results as Excel()

Create JSON for update()

FIG. 7G

MODEL CREATION AND MANAGEMENT USING A MODEL MANAGEMENT SERVICE

BACKGROUND

In the past, various projects (e.g., network evolution of network flows, network devices, network systems, organizations, or the like) would progress via work on the project by a team of individuals who were intimately familiar with the project and the history of the project. With rapid turnover in many organizations, this is not necessarily the case in some circumstances. Thus, valuable information about projects and/or their evolution may be lost and/or may not be accounted for in all circumstances.

SUMMARY

The present disclosure is directed to model creation and management using a model management service. An integrated information collection mechanism can obtain business metadata from a variety of sources. The integrated information collection mechanism (a model management service) can obtain the metadata and trigger targeted transformation to one or more metadata tracking systems. Modeling in each mapping to common contexts and concepts can enable formerly isolated modeling experts to work with an integrated federated event flow. The model management system also can enable modeling data between different domains and the data between these sources to explore a common view of the modeled information and to allow modeling processes from disparate sources and models to be merged in one area. The independent sources, tools, and domains may all provide input modeling metadata that can be merged in one place, thereby providing a comprehensive and integrated view of the modeled information as well as providing context for the users.

An event model can synchronize with online storage of metadata from models in catalogs and repositories; distribute information and knowledge by sharing and focusing on understandable linguistics focused on the context of concern; can be configurable and can be used generally for any modeling tool prioritized; and can minimize metadata customization using open standards of metadata and modeling information (including, for example, XMI for XML format, Open Data Standard 1.1 for JSON, or the like) and an optimized network and compute resources using a well-defined event-based approach with rest service standard endpoints.

A user or other entity (e.g., a user of a user device) can be responsible for modeling projects within an organization and/or entity (e.g., the network, an operator thereof, or the like). A project, as noted above, can include a process, an organization, a network flow, a device, a system, and/or other projects for which modeling (e.g., in system diagrams, UML diagrams, or other forms of models) may be useful. The user device can, for example by execution of the model management application, access a model management service that can be used to create models and/or manage models for the project over time and/or various iterations of the model. In some embodiments, the model management service can access one or more templates (e.g., model templates that can be used to model certain types or categories of projects), a code repository (which can store code for defining models and/or performing operations on other information to generate the models), and an asset catalog (which can store one or more assets, which can define subprocesses, subsystems, portions of network flows, portions of organizations, and/or other portions of the projects in modeling languages).

Via accessing the model management service, and/or via the exchange of model management data with the model management service (where the model management data can define the projects being modeled, modeling data, and/or other information), the model management service can generate one or more models. The generated models can be output by the model management service in a proprietary format and/or as neutral format content (e.g., a platform agnostic format such as hypertext markup language ("HTML"), extensible markup language ("XML"), or the like). Thus, the output can include the models and/or model data that can include and/or represent the models, with this output being stored at a cloud-based model repository such as a common repository. It should be understood that this example embodiment is illustrative, and therefore should not be construed as being limiting in any way.

After creation and storing of the models, the model management service also can support model enrichment, model transformation, model updating, and/or other types of modifications to the model. During these operations (e.g., enrichment, transformation, updating, and/or other modification operations), update events can be tracked by the model management service and used to define model update events and/or other forms of model history events. These update events and iterations of the models can be output to a model history that can be stored at a data storage resource such as the common repository. Thus, a model history can include a history of updates and iterations of the model over the history of updates. It should be understood that this example embodiment is illustrative, and therefore should not be construed as being limiting in any way.

The model management service also can support providing and supporting interactions between users and/or other entities and a model and model history view. This can enable users or other entities to view models over a lifecycle and/or over lifecycle events. Thus, users can view a history of evolution of a model associated with a project to gain insight into the history of the project and/or to view changes and/or iterations associated with the model. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining, from an authenticated user device, model management data that can include modeling data that can define a project to model. The project can include a network flow, a network system, a device, or a process. The operations further can include detecting, in the model management data, a selection of a template to apply to the project to generate the model; and creating, based on the model management data and the template, the model. The model can include a directory, a data structure, and a diagram that describes the project. The operations further can include converting the model into a device-agnostic format version of the model; and loading, to a common repository, model data that can include the device-agnostic format version of the model.

In some embodiments, the device-agnostic format version of the model can include hypertext markup language or extensible markup language. In some embodiments, the common repository can further store a model history associated with the model, the model history including data that can describe creation of the model. In some embodiments, operations can further include detecting a model update including a request to update the model; retrieving, from the common repository, the model; updating the model based on the model update; generating a model update event that defines an update to the model; adding the model update event to a model history stored at the common repository; and storing an updated model and an updated model history at the common repository.

In some embodiments, the model update event can include an addition to the model, and updating the model can include obtaining an asset from an asset catalog, the asset relating to the addition; and updating the model based on the asset and the model update event. In some embodiments, operations can further include receiving a request for a model history view relating to the model; obtaining model data and a model history from the common repository, the model data describing the model and the model history describing lifecycle events associated with the model; generating the model history view, the model history view depicting model update events associated with the model and versions of the model; and enabling interactions with the model history view by the authenticated user device via a portal. In some embodiments, the model history view can include depictions of at least two model update events associated with the model, the model update events being obtained from the model history, and the model history view can provide access to at least two versions of the model.

According to another aspect of the concepts and technologies disclosed herein, a method is disclosed. The method can include obtaining, at a server computer including a processor and from an authenticated user device, model management data that can include modeling data that defines a project to model. The project can include a network flow, a network system, a device, or a process. The method also can include detecting, by the processor and in the model management data, a selection of a template to apply to the project to generate the model; and creating, by the processor and based on the model management data and the template, the model. The model can include a directory, a data structure, and a diagram that describes the project. The method also can include converting, by the processor, the model into a device-agnostic format version of the model; and loading, by the processor and to a common repository, model data that can include the device-agnostic format version of the model.

In some embodiments, the device-agnostic format version of the model can include hypertext markup language or extensible markup language. In some embodiments, the common repository also stores a model history associated with the model, wherein the model history can include data that describes creation of the model. In some embodiments, the method can further include detecting, by the processor, a model update including a request to update the model; retrieving, by the processor and from the common repository, the model; updating, by the processor, the model based on the model update; generating, by the processor, a model update event that defines an update to the model; adding, by the processor, the model update event to a model history stored at the common repository; and storing, by the processor, an updated model and an updated model history at the common repository.

In some embodiments, the model update event can include an addition to the model, and updating the model can include obtaining an asset from an asset catalog, the asset relating to the addition; and updating the model based on the asset and the model update event. In some embodiments, the method can further include receiving a request for a model history view relating to the model; obtaining model data and a model history from the common repository, the model data describing the model and the model history describing lifecycle events associated with the model; and generating the model history view. The model history view can include depictions of at least two model update events associated with the model, the at least two model update events being obtained from the model history. The model history view also can provide access to at least two versions of the model. The method also can include enabling interactions with the model history view by the authenticated user device via portal.

According to yet another aspect of the concepts and technologies disclosed herein, a computer storage medium is disclosed. The computer storage medium can store computer-executable instructions that, when executed by a processor, cause the processor to perform operations. The operations can include obtaining, from an authenticated user device, model management data that can include modeling data that can define a project to model. The project can include a network flow, a network system, a device, or a process. The operations further can include detecting, in the model management data, a selection of a template to apply to the project to generate the model; and creating, based on the model management data and the template, the model. The model can include a directory, a data structure, and a diagram that describes the project. The operations further can include converting the model into a device-agnostic format version of the model; and loading, to a common repository, model data that can include the device-agnostic format version of the model.

In some embodiments, the device-agnostic format version of the model can include hypertext markup language or extensible markup language. In some embodiments, the common repository can further store a model history associated with the model, the model history including data that can describe creation of the model. In some embodiments, operations can further include detecting a model update including a request to update the model; retrieving, from the common repository, the model; updating the model based on the model update; generating a model update event that defines an update to the model; adding the model update event to a model history stored at the common repository; and storing an updated model and an updated model history at the common repository.

In some embodiments, the model update event can include an addition to the model, and updating the model can include obtaining an asset from an asset catalog, the asset relating to the addition; and updating the model based on the asset and the model update event. In some embodiments, operations can further include receiving a request for a model history view relating to the model; obtaining model data and a model history from the common repository, the model data describing the model and the model history describing lifecycle events associated with the model; generating the model history view, the model history view depicting model update events associated with the model and versions of the model; and enabling interactions with the model history view by the authenticated user device via a portal. In some embodiments, the model history view can include depictions of at least two model update events associated with the model, the model update events being obtained from the model history, and the model history view can provide access to at least two versions of the model.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIGS. 7A-7H are example call flow diagrams illustrating additional aspects of the concepts and technologies disclosed herein for creating, storing modifying, and interacting with a model using a model management service, according to some illustrative embodiments of the concepts and technologies described herein.

DETAILED DESCRIPTION

Figure 1:
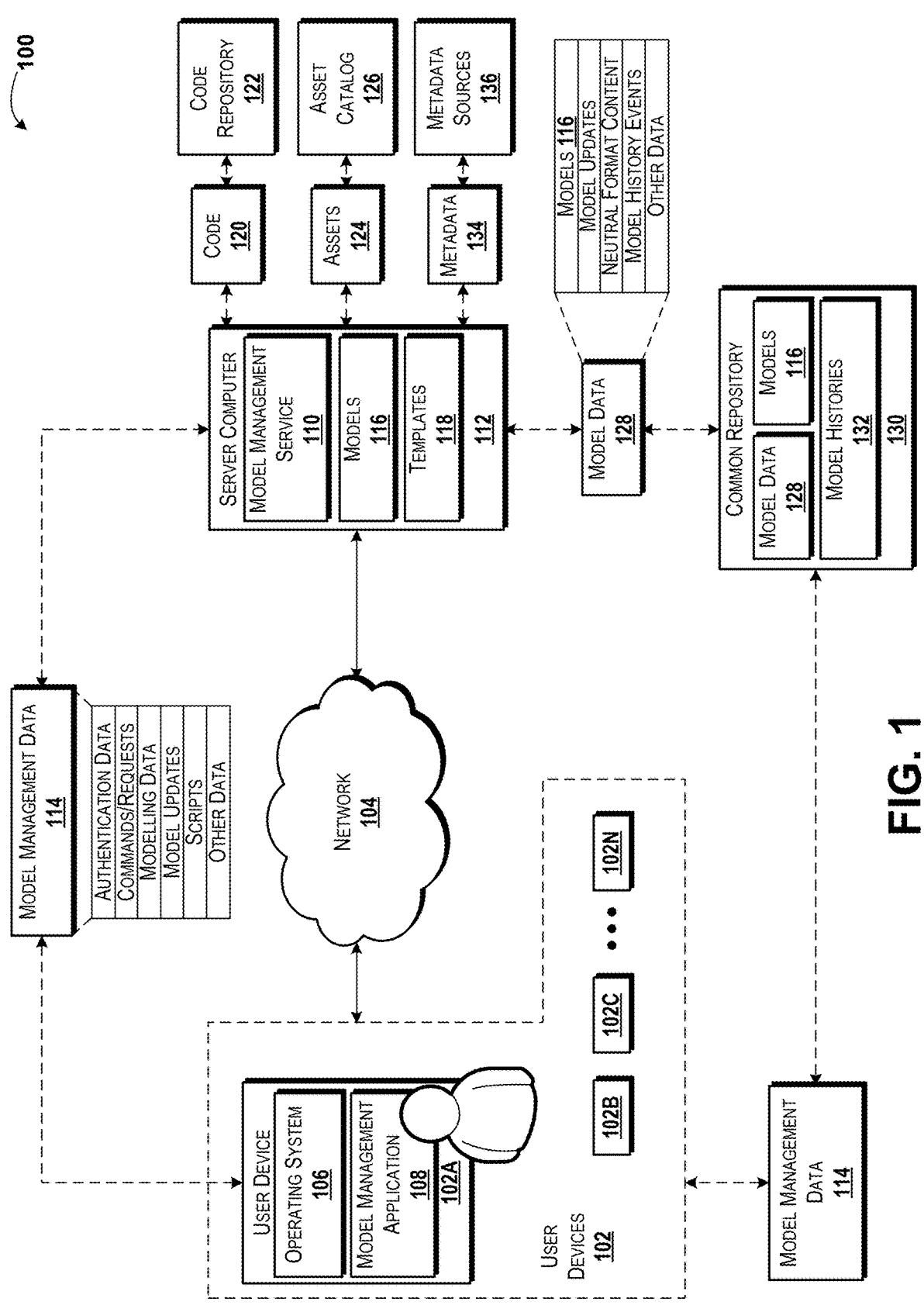
FIG. 1 is a system diagram illustrating an illustrative operating environment for various embodiments of the concepts and technologies described herein.

The following detailed description is directed to providing model creation and management using a model management service. A user or other entity (e.g., a user of a user device) can be responsible for modeling projects within an organization and/or entity (e.g., the network, an operator thereof, or the like). A project, as noted above, can include a process, an organization, a network flow, a device, a system, and/or other projects for which modeling (e.g., in system diagrams, UML diagrams, or other forms of models) may be useful. The user device can, for example by execution of the model management application, access a model management service that can be used to create models and/or manage models for the project over time and/or various iterations of the model. In some embodiments, the model management service can access one or more templates (e.g., model templates that can be used to model certain types or categories of projects), a code repository (which can store code for defining models and/or performing operations on other information to generate the models), and an asset catalog (which can store one or more assets, which can define subprocesses, subsystems, portions of network flows, portions of organizations, and/or other portions of the projects in modeling languages).

Via accessing the model management service, and/or via the exchange of model management data with the model management service (where the model management data can define the projects being modeled, modeling data, and/or other information), the model management service can generate one or more models. The generated models can be output by the model management service in a proprietary format and/or as neutral format content (e.g., a platform agnostic format such as HTML, XML, or the like). Thus, the output can include the models and/or model data that can include and/or represent the models, with this output being stored at a cloud-based model repository such as a common repository. It should be understood that this example embodiment is illustrative, and therefore should not be construed as being limiting in any way.

After creation and storing of the models, the model management service also can support model enrichment, model transformation, model updating, and/or other types of modifications to the model. During these operations (e.g., enrichment, transformation, updating, and/or other modification operations), update events can be tracked by the model management service and used to define model update events and/or other forms of model history events. These update events and iterations of the models can be output to a model history that can be stored at a data storage resource such as the common repository. Thus, a model history can include a history of updates and iterations of the model over the history of updates. It should be understood that this example embodiment is illustrative, and therefore should not be construed as being limiting in any way.

The model management service also can support providing and supporting interactions between users and/or other entities and a model and model history view. This can enable users or other entities to view models over a lifecycle and/or over lifecycle events. Thus, users can view a history of evolution of a model associated with a project to gain insight into the history of the project and/or to view changes and/or iterations associated with the model. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing model creation and management using a model management service will be described, according to an illustrative embodiment. The operating environment 100 shown in FIG. 1 includes one or more user device 102A-N (hereinafter collectively and/or generically referred to as the "user devices 102"). The user devices 102 can operate in communication with and/or as part of a communications network ("network") 104, though this is not necessarily the case in all embodiments. The user device 102A will be described in more detail for purposes of illustrating the concepts and technologies disclosed herein, but it should be understood that one or more (or even all) of the user devices 102 may have an architecture similar or even identical to the user device 102A and/or that one or more (or even all) of the user devices 102 may perform the functionality illustrated and described herein with respect to the user device 102A. As such, it should be understood that the illustrated and described example embodiment is illustrative, and therefore should not be construed as being limiting in any way.

According to various embodiments, the functionality of user device 102A may be provided by one or more server computers, one or more desktop computers, one or more mobile telephones, one or more smartphones, one or more tablet computers, one or more laptop computers, other computing systems, and the like. It should be understood that the functionality of user device 102A may be provided by a single device, by two or more similar devices, and/or by two or more dissimilar devices. For purposes of describing the concepts and technologies disclosed herein, the user device 102A is described herein as a personal computer such as a laptop computer, a desktop computer, a tablet computer, or the like. It should be understood that this embodiment is illustrative, and should not be construed as being limiting in any way.

The user device 102A can execute an operating system 106 and one or more application programs such as, for example, a model management application 108. The operating system 106 can include a computer program that can control the operation of the user device 102. The model management application 108 can include an executable program that can be configured to execute on top of the operating system 106 to provide various functions as illustrated and described herein. In some embodiments of the concepts and technologies disclosed herein, as will be appreciated with reference to the description herein, the functionality of the model management application 108 may be provided in some embodiments by a web browser or the like, which may provide various functions as illustrated and described by way of interacting with a model management service 110 executed and/or hosted on a server computer 112. The model management application 108 may provide the functionality in some embodiments, for example, by rendering and/or exchanging model management data 114, which may be exchanged by the user device 102A and the server computer 112 via communications between the user device 102A and the server computer 112 (e.g., in some embodiments via data exchanges via a portal or API exposed by the server computer 112). It should be understood that this example embodiment is illustrative, and therefore should not be construed as being limiting in any way.

According to various embodiments of the concepts and technologies disclosed herein, the model management data 114 can include, for example, authentication data, commands and/or requests, modeling data, model updates, scripts, and/or other data. The authentication data can include data and/or data communications that may be exchanged by the user device 102A and the server computer 112 (or other device such as an authentication server or the like) to authenticate the user device 102A as a user of the model management service 110. In various embodiments of the concepts and technologies disclosed herein, the authentication data can include logins, passwords, network identifiers, and/or other information that can be used to determine if the user device 102A and/or a user thereof is permitted to access and/or use the functionality of the model management service 110. Thus, it can be appreciated that the model management service 110 can be a subscription-based service and/or a service that is limited to certain users, devices, and/or organizations in various embodiments. It should be understood that this example embodiment is illustrative, and therefore should not be construed as being limiting in any way.

The commands and/or requests can include, for example, requests to authenticate (e.g., from the user device 102A and/or other user devices 102), requests for providing challenges (e.g., logins, passwords, or the like), requests for types of data and/or information associated with the modeling functionality of the model management service 110 illustrated and described herein, and/or other requests and/or responses to the requests as illustrated and described herein. The commands and requests also can include commands to trigger various actions as illustrated and described herein or the like. It should be understood that these example embodiments are illustrative, and therefore should not be construed as being limiting in any way.

The modeling data can include various types of information that can define representations of processes and/or devices to the model management service 110. Thus, the modeling data can include data that describes processes, devices, or the like. The modeling data can be used by the model management service 110 to generate one or more models 116 as will be explained in more detail herein. The model updates can include changes to the models 116 created by the model management service 110. For example, the model updates can be used to transform the models 116; to introduce functionality to the models 116; to iterate versions of the models 116; to save histories relating to models 116, their evolution, and/or changes thereto; combinations thereof; or the like. Because other model updates are possible and are contemplated as illustrated and described herein, it should be understood that these example embodiments are illustrative, and therefore should not be construed as being limiting in any way.

The scripts can include executable code (e.g., JSON files, or the like), which can be loaded to the user devices 102 and/or executed thereby (e.g., a JSON file that can be provided to the user device 102A and executed within a browser environment as is generally understood). Thus, the scripts can include applications, network scripts, and/or other executable files that can be loaded to the user device 102A and executed thereby. It should be understood that this example embodiment is illustrative, and therefore should not be construed as being limiting in any way.

The other data can include other types of information illustrated and described herein such as, for example, location information, permission lists, graphics data (e.g., renderable displays), other types of information, combinations thereof, or the like. The model management data 114 can be created by the user devices 102 and/or the server computer 112, as can be appreciated by referring to the description of the model management service 110 hereinbelow.

According to various embodiments of the concepts and technologies disclosed herein, the model management service 110 can be configured to communicate with one or more of the user devices 102 (e.g., via exchange of the model management data 114 with the model management application 108) to provide the various model lifecycle management illustrated and described herein. According to some embodiments, the model management service 110 can communicate with the user devices 102 to enable users and/or other authorized users of the user devices 102 to create one or more model(s) 116 (e.g., via one or more model templates (hereinafter referred to and illustrated in FIG. 1 as "templates 118") in some embodiments and/or via other functionality); to store the models 116 in one or more data storage devices and/or entities in communication with the server computer 112; to enable one or more user devices 102 to enrich, update, and/or transform the models 116 (e.g., via obtaining and/or saving code 120 from and/or to one or more code repository 122; via obtaining and/or using one or more assets 124 from one or more asset catalog 126); and/or via other operations as will be illustrated and described herein in detail below. The model management service 110 also can be configured to create and/or generate model data 128, which can include model updates and/or enrichments, models 116 in a proprietary format or represented in neutral format content (e.g., HTML XML, or other forms of neutral format content); one or more model history events (e.g., events that mark and/or define creation, evolution, and/or enrichment events relating to one or more of the models 116); and/or other data such as e.g., transcripts, summaries, tables, scripts, CSV files, and the like.

In some embodiments, the model data 128 can be stored by the server computer 112 in one or more data repositories such as the common repository 130 illustrated in FIG. 1. The functionality of the common repository 130 can be provided by one or more databases, server computers, desktop computers, laptop computers, other computing systems, and the like. In the illustrated embodiments, the functionality of the common repository can be provided by a cloud-based data storage platform. It should be understood that this example embodiment is illustrative, and therefore should not be construed as being limiting in any way.

It can be appreciated from the above that the model management service 110 can be configured to enable viewing of models 116 in one or more renderable displays; to enable viewing of one or more history of the models 116 representing creation, evolution, and/or enrichment of the models 116 (hereinafter collectively and/or generically referred to as "model histories 132"); and/or to provide other functionality as illustrated and described hereinbelow. It should be understood that this example embodiment is illustrative, and therefore should not be construed as being limiting in any way.

According to some embodiments of the concepts and technologies disclosed herein, the model management service 110 can be configured to support a model creation and management lifecycle for various users and/or entities. At a high level, the lifecycle of a model 116 can include a creation phase, wherein a user or other entity can create one or more models 116 (optionally using one or more templates 118 in some embodiments) and save the models 116 to a data storage location (e.g., a local cache or data storage device, a common repository in communication with the user devices 102 and/or the server computer 112, and/or other repositories or data storage resources); a model enrichment, updating, and/or transformation phase wherein one or more entities (e.g., one or more user device 102) can access models 116 and edit, update, and/or otherwise modify the models 116; and a model 116 and/or model history 132 viewing phase wherein one or more entities (e.g., one or more user devices 102) can access one or more iterations of the models 116 and/or model histories 132. Of course, other operations as illustrated and described herein can be performed by the model management service 110 during the lifecycle of the models 116. As such, it should be understood that this example embodiment is illustrative, and therefore should not be construed as being limiting in any way.

In some embodiments, a model creation phase as mentioned above can include a number of operations that can be provided by the model management service 110 and/or the model management application 108. As noted above, the model management application 108 can be configured to interact with the model management service 110 to perform the various operations illustrated and described herein with reference to the user devices 102 and in some instances can include a natively-executed stand-alone application and/or other types of applications such as a web browser (which may be configured to obtain model management data 114 from the model management service 110, e.g., via portal or API, and to render the information, e.g., in one or more webpages to enable to functionality illustrated and described herein). Because other methods of interacting with the model management service 110 are possible and are contemplated, it should be understood that this example embodiment is illustrative, and therefore should not be construed as being limiting in any way.

Before initiating the creation phase of the model management lifecycle, some embodiments of the model management service 110 can enforce an authentication scheme against users and/or devices (e.g., the user device 102A) attempting to access the model management service 110. Thus, although not shown in FIG. 1, it can be appreciated that a "triple-A" server (i.e., an AAA server, which generally refers to a server that provides authentication, authorization and accounting services for various entities in a system such as the network 104) can be provided in some embodiments to manage this authentication process. In some other embodiments, the server computer 112 can include an authentication module or other functionality for providing these and/or other authentication services for the model management service 110.

An authenticated user or device (e.g., the user device 102A) can request, from the model management service 110, code 120 associated with a project that is to be modeled. The model management service 110 can be configured to obtain code 120 associated with the project from one or more code repositories 122 or other data storage resources. The model management service 110 can provide the code 120 (e.g., as part of the model management data 114 and via a portal, API, webpage, or the like) to the user device 102A for analysis and/or viewing at the user device 102A. The user device 102A also can obtain (e.g., as part of the model management data 114 from the server computer 112 or other entities) one or more scripts (e.g., network scripts) such as JSON files, or the like, for execution at the user device 102A.

The scripts can be executed by the user device 102A (e.g., via execution of the model management application 108) to create a model 116 based on the project and/or other data such as the code 120 and/or scripts. During creation of the model 116, the user device 102A or other entity (e.g., the server computer 112) can generate one or more directories, one or more data structures, and/or one or more diagrams that collectively and/or individually can be considered the models 116 illustrated and described herein. The user device 102A can be configured to load the models 116 to the common repository 130 in some embodiments, or to provide, to the server computer 112, modeling data to the server computer 112 and the server computer 112 can store the models 116 at the common repository 130 or elsewhere. It should be understood that this example embodiment is illustrative, and therefore should not be construed as being limiting in any way.

After creation of the models 116, one or more users, devices, or other entities can be configured to update the models 116. In particular, various operations can be performed on the models 116 to transform the models 116, to update the models 116, to record history events associated with the models 116, and/or otherwise to modify the models 116 as illustrated and described herein. According to various embodiments of the concepts and technologies disclosed herein, the models 116 can be updated for any of a variety of reasons, some of which are described herein as example embodiments.

For example, in one contemplated embodiment, a user or other entity (e.g., a user associated with the user device 102A) may update a job aid. This change may result in a change to one or more processes associated with a particular model 116. For example, if a model 116 represents a network flow, network architecture, network flow diagram, or the like, a change to a job aid may result in a change to the network flow, the network architecture, the network flow diagram, or the like. It should be understood that this example embodiment is illustrative, and therefore should not be construed as being limiting in any way. Other contemplated embodiments illustrated and described herein include a transformation request for the model 116 (e.g., adding or removing assets, changing the model 116, or the like) and recording events associated with the models 116. It should be understood that these example embodiments are illustrative, and therefore should not be construed as being limiting in any way.

In response to the model management service 110 detecting a model update event such as those mentioned above (e.g., a transformation request, a job aid update, an event, or the like), the model management service 110 can be configured to update the model 116 based on the model update event. The model management service 110 also can be configured to propagate the changes to other entities and/or to trigger updates to other entities (e.g., to update across platforms, to update assets 124 in the asset catalog 126, to update code 120 in the code repository 122, or the like). The model management service 110 can store the updated model 116 and/or a model history 132 that can track the (now at least two) versions of the models 116 including the original model 116 and the updated version of the model 116. The model management service 110 can generate model data 128 (which can represent the model updates and model history events) and provide the updated model and model history 132 (or updated model history 132) to the common repository 130 or other data storage resource. In various embodiments of the concepts and technologies disclosed herein, the model data 128 also can represent the model 116 as neutral format content (e.g., HTML content, XML, or the like) so that the model 116 can be viewed across platforms and/or by almost any user or device. It should be understood that this example embodiment is illustrative, and therefore should not be construed as being limiting in any way.

The model management service 110 also can be configured to enable devices and/or other entities to view models 116 and model histories 132, as well as interacting with the models 116 and/or model histories 132. In some example embodiments, the model management service 110 can receive a request to view a model 116 and/or a model history view (e.g., a view of a model history 132 with links to iterations of models 116 and/or related files such as diagrams, structures, code 120, and the like). In response to the request, the model management service 110 can be configured to identify the model 116 (associated with the requested model 116 and/or requested model history 132) and obtain model data 128 associated with the identified model 116 and/or model history 132. In various embodiments of the concepts and technologies disclosed herein, the model management service 110 can obtain the model data 128 from the common repository 130 and/or other data storage resources or structures.

The model management service 110 can be configured to generate, based on the model data 128, a model history view, which can include renderable data that can be provided to one or more users, devices, or entities (e.g., the user devices 102) for viewing. As noted above, the model history views (some examples of which are illustrated and described below with reference to FIGS. 6A-6C) can provide a graphical representation of the model history 132 and one or more models 116 represented in the model history 132. Thus, users can see an evolution of a model 116 during its life cycle from creation to a most recent iteration, and can be enabled to access associated models 116 and/or related data such as diagrams, structures, or the like across the life cycle events. The model management service 110 can enable interactions with the model history view and provide updated iterations of the model history view at appropriate times in various embodiments. It should be understood that this example embodiment is illustrative, and therefore should not be construed as being limiting in any way.

According to various embodiments of the concepts and technologies disclosed herein, the model management service 110 can also be configured to collect one or more streams of metadata 134 relating to one or more projects and/or models 116 of the projects. The metadata 134 can be collected and/or otherwise obtained from any number of network systems, devices, software, or the like (hereinafter referred to as "metadata sources 136"). In various embodiments of the concepts and technologies disclosed herein, the model management service 110 can detect model update events based on the metadata 134. Thus, the models 116 can be based on any metadata 134 relating to a project and/or model 116, and the model data 128 can represent the metadata 134 in various embodiments. It should be understood that this example embodiment is illustrative, and therefore should not be construed as being limiting in any way.

In general, a user or other entity (e.g., a user of a user device 102A) can be responsible for modeling projects within an organization and/or entity (e.g., the network 104, an operator thereof, or the like). A project, as noted above, can include a process, an organization, a network flow, a device, a system, and/or other projects for which modeling (e.g., in system diagrams, UML diagrams, or other forms of models) may be useful. The user device 102A can, for example by execution of the model management application 108, access a model management service 110 that can be used to create models and/or manage models 116 for the project over time and/or various iterations of the model 116. In some embodiments, the model management service 110 can access one or more templates 118 (e.g., model templates that can be used to model certain types or categories of projects), a code repository 122 (which can store code 120 for defining models 116 and/or performing operations on other information to generate the models 116), and an asset catalog 126 (which can store one or more assets 124, which can define subprocesses, subsystems, portions of network flows, portions of organizations, and/or other portions of the projects in modeling languages).

Via accessing the model management service 110, and/or via the exchange of model management data 114 with the model management service 110 (where the model management data 114 can define the projects being modeled, modeling data, and/or other information), the model management service 110 can generate one or more models 116. The generated models 116 can be output by the model management service 110 in a proprietary format and/or as neutral format content (e.g., a platform agnostic format such as HTML, XML, or the like). Thus, the output can include the models 116 and/or model data 128 that can include and/or represent the models 116, with this output being stored at a cloud-based model repository such as the common repository 130 illustrated in FIG. 1. It should be understood that this example embodiment is illustrative, and therefore should not be construed as being limiting in any way.

After creation and storing of the models 116, the model management service 110 also can support model enrichment, model transformation, model updating, and/or other types of modifications to the model 116. During these operations (e.g., transformation, updating, and/or other modification operations), update events can be tracked by the model management service 110 and used to define model update events and/or other forms of model history events. These update events and iterations of the models 116 can be output to a model history 132 that can be stored at a data storage resource such as the common repository 130. Thus, a model history 132 can include a history of updates and iterations of the model 116 over the history of updates. It should be understood that this example embodiment is illustrative, and therefore should not be construed as being limiting in any way.

The model management service 110 also can support providing and supporting interactions between users and/or other entities and a model and model history view. This can enable users or other entities to view models 116 over a lifecycle and/or over lifecycle events. Thus, users can view a history of evolution of a model 116 associated with a project to gain insight into the history of the project and/or to view changes and/or iterations associated with the model 116. It should be understood that this example embodiment is illustrative, and therefore should not be construed as being limiting in any way.

FIG. 1 illustrates four user devices 102, one network 104, one server computer 112, one code repository 122, one asset catalog 126, and one common repository 130. It should be understood, however, that various implementations of the operating environment 100 can include zero, one, two, three, four, or more than four user devices 102; one or more than one network 104; zero, one, or more than one server computer 112; zero, one, or more than one code repository 122; zero, one, or more than one asset catalog 126; and zero, one, or more than one common repository 130. As such, the illustrated embodiment should be understood as being illustrative, and should not be construed as being limiting in any way.

Figure 2:
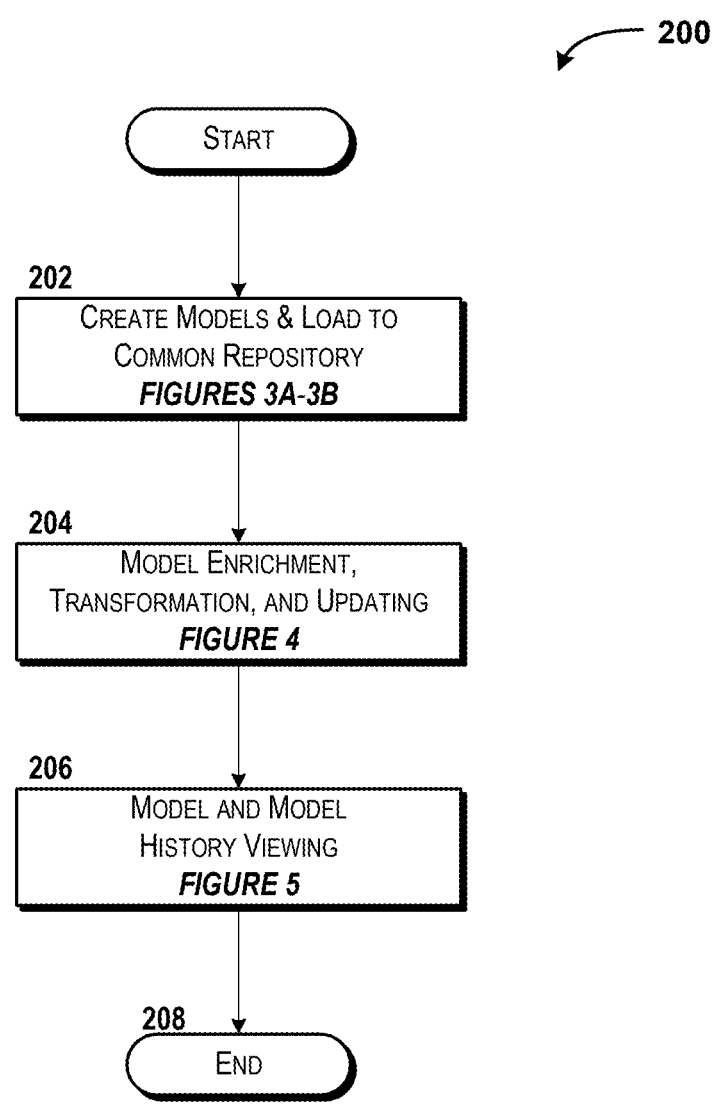
FIG. 2 is a flow diagram showing aspects of a method for creating, storing, modifying, and interacting with a model using a model management service, according to an illustrative embodiment of the concepts and technologies described herein.

Turning now to FIG. 2, aspects of a method 200 for creating, storing, modifying, and interacting with a model using a model management service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 112, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the model management service 110. It should be understood that additional and/or alternative devices and/or network nodes can provide the functionality described herein via execution of one or more modules, applications, and/or other software including, but not limited to, the model management service 110. Thus, the illustrated embodiments are illustrative, and should not be viewed as being limiting in any way.

The method 200 begins at operation 202. At operation 202, the server computer 112 can be used to create and store one or more models 116. For example, operation 202 can correspond to the server computer 112 enabling the creation of one or more models 116 and the loading of the one or more models 116 to a common repository 130 or other data storage resource. It should be understood that this example embodiment is illustrative, and therefore should not be construed as being limiting in any way.

In some embodiments of the concepts and technologies disclosed herein, creation of one or more models 116 can include a number of operations that can be provided by the model management service 110 and/or the model management application 108. As mentioned above, some embodiments of the model management service 110 can enforce an authentication requirement for users and/or devices attempting to create the models 116. The model management service 110 can be configured to trigger authentication by other entities (e.g., an authentication server or module), or to include an authentication module or other functionality for providing these and/or other authentication services for the model management service 110. An authenticated user or device can request, from the model management service 110, code 120 associated with a project that is to be modeled. The model management service 110 can provide the code 120 (e.g., as part of the model management data 114 and via a portal, API, webpage, or the like) to the user device 102A for analysis and/or viewing at the user device 102A. The user device 102A also can obtain (e.g., as part of the model management data 114 from the server computer 112 or other entities) one or more scripts for execution at the user device 102A.

The scripts can be executed by the user device 102A (e.g., via execution of the model management application 108) to create a model 116 based on the project, one or more templates 118, and/or other data such as the code 120 and/or scripts. During creation of the model 116, the user device 102A or other entity (e.g., the server computer 112) can generate one or more directories, one or more data structures, and/or one or more diagrams that collectively and/or individually can be considered the models 116 illustrated and described herein. The user device 102A can be configured to load the models 116 to a data storage resource (e.g., the common repository 130 in some embodiments), or to provide, to the server computer 112, modeling data to the server computer 112 and the server computer 112 can store the models 116 at the common repository 130 or elsewhere. It should be understood that this example embodiment is illustrative, and therefore should not be construed as being limiting in any way. Additional details of the model creation will be illustrated and described in more detail below, particularly with reference to FIGS. 3A and 3B.

From operation 202, the method 200 can proceed to operation 204. At operation 204, the server computer 112 can enable model enrichment, transformation, and/or updating. In various embodiments, one or more users, devices, or other entities can be configured to update the models 116. In particular, various operations can be performed on the models 116 to transform the models 116, to update the models 116, to record history events associated with the models 116, and/or otherwise to modify the models 116 as illustrated and described herein. According to various embodiments of the concepts and technologies disclosed herein, the models 116 can be updated for any of a variety of reasons, some of which are described herein as example embodiments.

In response to the model management service 110 detecting a model update event (e.g., a transformation request, a job aid update, an event, or the like), the model management service 110 can be configured to update the model 116 based on the model update event. The model management service 110 also can be configured to propagate the changes to other entities and/or to trigger updates to other entities (e.g., to update across platforms, to update assets 124 in the asset catalog 126, to update code 120 in the code repository 122, or the like). The model management service 110 can store the updated model 116 and/or a model history 132 that can track two or more versions of the models 116. In some instances, metadata describing the models 116 and/or model histories 132 can be used to track the iterations of the model 116.

The model management service 110 can generate model data 128 (which can represent the model updates and model history events) and provide the updated model and model history 132 (or updated model history 132) to the common repository 130 or other data storage resource. In various embodiments of the concepts and technologies disclosed herein, the model data 128 also can represent the model 116 in neutral format content (e.g., HTML content, XML, or the like) so that the model 116 can be viewed across platforms and/or by almost any user or device. It should be understood that this example embodiment is illustrative, and therefore should not be construed as being limiting in any way. Additional details of modifying and/or updating the models 116 will be illustrated and described in more detail below, particularly with reference to FIG. 4.

From operation 204, the method 200 can proceed to operation 206. At operation 206, the server computer 112 can enable model and model history viewing. In some embodiments, the model management service 110 can receive a request to view a model 116 and/or a model history view (e.g., a view of a model history 132 with one or more links or embedded files representing iterations of the models 116 and/or related files such as diagrams, structures, code 120, and the like). In response to detecting or receiving the request, the model management service 110 can be configured to identify the model 116 (associated with the requested model 116 and/or requested model history 132) and obtain model data 128 associated with the identified model 116 and/or model history 132. In various embodiments of the concepts and technologies disclosed herein, the model management service 110 can obtain the model data 128 from the common repository 130 and/or other data storage resources or structures.

The model management service 110 can be configured to generate, based on the model data 128, a model history view, which can include renderable data that can be provided to one or more users, devices, or entities such as the user devices 102 for viewing and/or interacting with at the user devices 102. The model history views can provide a graphical representation of the model history 132 and one or more models 116 represented in the model history 132. Thus, embodiments of the concepts and technologies disclosed herein can enable viewing of an evolution of a model 116 during its life cycle from creation to a most recent iteration, and can enable access to associated models 116 and/or to related data such as diagrams, structures, or the like across the life cycle events. The model management service 110 can enable interactions with the model history view and provide updated iterations of the model history view at appropriate times in various embodiments. It should be understood that this example embodiment is illustrative, and therefore should not be construed as being limiting in any way. Additional details of model and model history viewing will be illustrated and described in more detail below, particularly with reference to FIG. 5.

From operation 206, the method 200 can proceed to operation 208. The method 200 can end at operation 208.

Figure 3A:
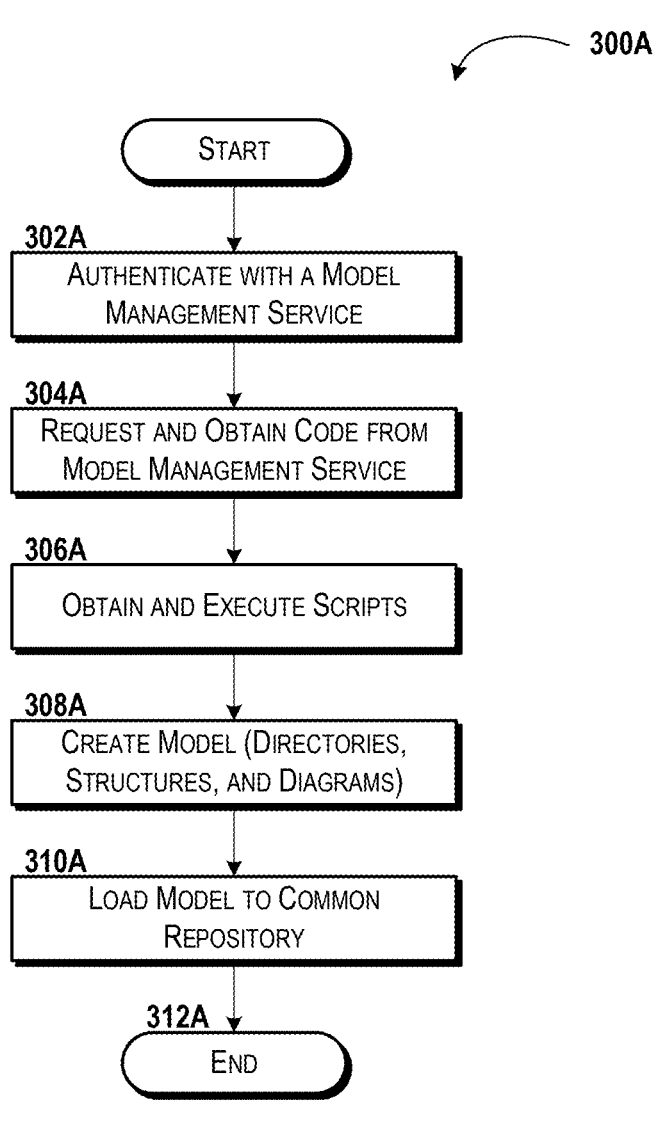
FIG. 3A is a flow diagram showing aspects of a method for creating and storing a model using a model management service, according to an illustrative embodiment of the concepts and technologies described herein.
Figure 3B:
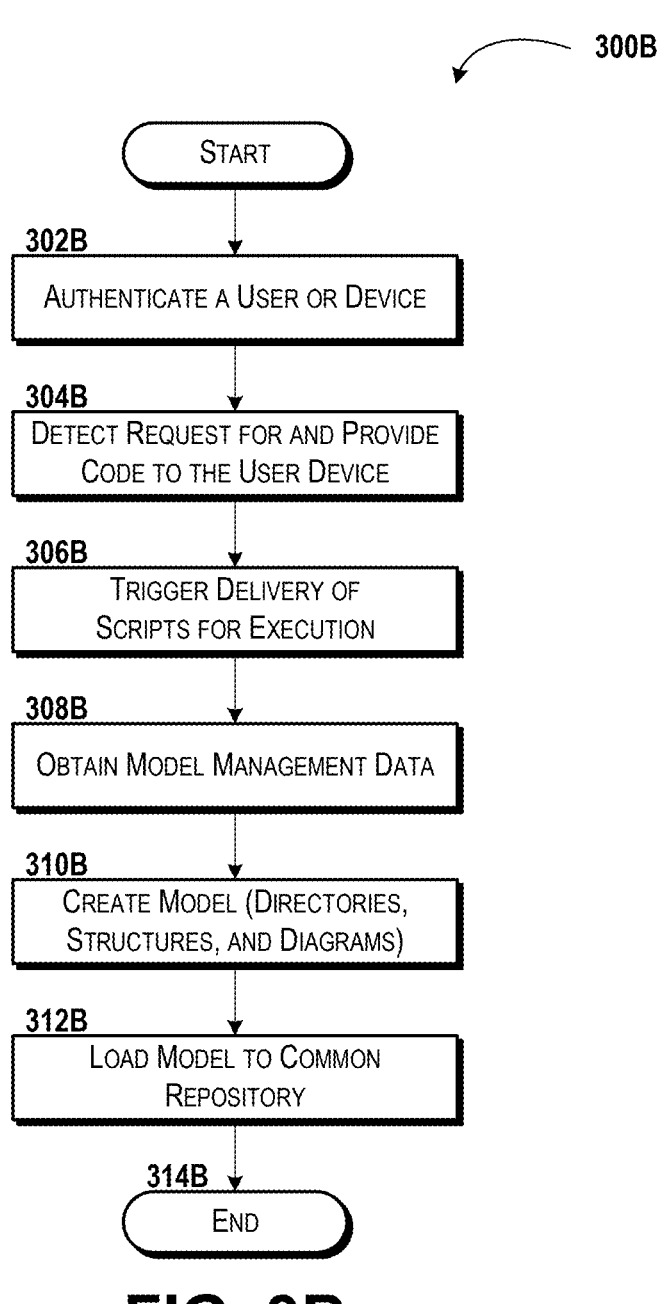
FIG. 3B is a flow diagram showing aspects of a method for creating and storing a model using a model management service, according to another illustrative embodiment of the concepts and technologies described herein.

Turning now to FIG. 3A, aspects of a method 300A for creating and storing a model using a model management service will be described in detail, according to an illustrative embodiment. For purposes of illustrating and describing the concepts of the present disclosure, the method 300A is described herein as being performed by the user device 102 via execution of one or more software modules such as, for example, the model management application 108. It should be understood that additional and/or alternative devices and/or network nodes can provide the functionality described herein via execution of one or more modules, applications, and/or other software including, but not limited to, the model management application 108. Thus, the illustrated embodiments are illustrative, and should not be viewed as being limiting in any way.

The method 300A begins at operation 302A. At operation 302A, the user device 102 can authenticate with a model management service 110. Some embodiments of the model management service 110 can enforce an authentication requirement for users and/or devices attempting to create the models 116. The model management service 110 can be configured to trigger authentication by other entities (e.g., an authentication server or module), or to include an authentication module or other functionality for providing these and/or other authentication services for the model management service 110. Regardless of how the authentication is handled, operation 302A can correspond to the user device 102 successfully authenticating to gain access to the model management service 110. It should be understood that this example embodiment is illustrative, and therefore should not be construed as being limiting in any way.

From operation 302A, the method 300A can proceed to operation 304A. At operation 304A, the user device 102 can request and obtain code 120 from the model management service 110. According to various embodiments of the concepts and technologies disclosed herein, an authenticated user or device such as the user device 102 can be configured to request, from the model management service 110, code 120 associated with and/or representing a project, flow, process, product, network or component thereof, and/or the like, where this project is to be modeled. The model management service 110 can be configured to retrieve the code 120 (e.g., from a code repository 122) and to provide the code 120 (e.g., as part of the model management data 114 and via a portal, API, webpage, or the like) to the user device 102 for analysis and/or viewing at the user device 102. The user device 102 can be configured to store the code 120 in a local cache or other data storage device or resource. It should be understood that this example embodiment is illustrative, and therefore should not be construed as being limiting in any way.

From operation 304A, the method 300A can proceed to operation 306A. At operation 306A, the user device 102 can obtain and execute one or more scripts. According to various embodiments of the concepts and technologies disclosed herein, the user device 102 can obtain (e.g., as part of the model management data 114 from the server computer 112 or other entities) one or more scripts for execution at the user device 102. The scripts can be executed by the user device 102A (e.g., via execution of the model management application 108) to create a model 116 based on the project, one or more templates 118, and/or other data such as the code 120 and/or scripts. In some embodiments, the scripts can be executed to standardize (e.g., in accordance with defined templates 118, guidelines, or the like) analysis of the model management data 114 to create the model 116 illustrated and described herein. In some embodiments, the scripts can be locally stored by the user device 102 (e.g., identifiable and/or assignable by the model management application 108), though this is not the case in all embodiments. Regardless, it should be understood that during the creation phase, the user device 102 can be enabled to provide use of templates and scripts to enable "drag and drop" creation functions and/or the like, by standardizing representations of certain types of projects such as flows, products, network devices, software, or the like. It should be understood that this example embodiment is illustrative, and therefore should not be construed as being limiting in any way.

From operation 306A, the method 300A can proceed to operation 308A. At operation 308A, the user device 102 can create a model 116 and/or related files such as directories, structures, and diagrams. The user device 102 can be configured to generate, based on the code 120, the scripts, one or more templates 118, and/or the project contours, one or more directories, one or more data structures, and/or one or more diagrams that collectively and/or individually can be considered the models 116 illustrated and described herein. It should be understood that this example embodiment is illustrative, and therefore should not be construed as being limiting in any way.

From operation 308A, the method 300A can proceed to operation 310A. At operation 310A, the user device 102 can load (or trigger the loading of) the model 116 to a common repository 130. In various embodiments of the concepts and technologies disclosed herein, the user device 102 can be configured to load the models 116 to a data storage resource (e.g., the common repository 130 in some embodiments), or to provide, to the server computer 112, modeling data to the server computer 112 and the server computer 112 can store the models 116 at the common repository 130 or elsewhere. It should be understood that this example embodiment is illustrative, and therefore should not be construed as being limiting in any way.

From operation 310A, the method 300A can proceed to operation 312A. The method 300A can end at operation 312A.

While FIG. 3A was described as being performed by the user device 102 via execution of the model management application 108, it should be understood that the functionality of FIG. 3A or substantially similar functionality can also be performed by the server computer 112 via execution of the model management service 110. As such, turning to FIG. 3B, aspects of a method 300B for creating and storing a model 116 using a model management service 110 will be described in detail, according to another illustrative embodiment. For purposes of illustrating and describing the concepts of the present disclosure, the method 300B is described herein as being performed by the server computer 112 via execution of one or more software modules such as, for example, the model management service 110. It should be understood that additional and/or alternative devices and/or network nodes can provide the functionality described herein via execution of one or more modules, applications, and/or other software including, but not limited to, the model management application 108. Thus, the illustrated embodiments are illustrative, and should not be viewed as being limiting in any way.

The method 300B begins and flow proceeds to operation 302B. At operation 302B the server computer 112 can authenticate the user device 102 (or detect connection of an authenticated user such as the user device 102). From operation 302B, the method 300B can proceed to operation 304B. In operation 304B, the server computer 112 can receive a request for the code 120 (for example from the user device 102) or other device, user, or entity, and provide the code 120 to the user device 102.

From operation 304B, the method 300B can proceed to operation 306B. In operation 306B, the server computer 112 can trigger delivery of one or more scripts to the user device for execution. In some embodiments, the functionality of operation 306B can include the server computer 112 enabling access to scripts for the user device 102, though this is not necessarily the case in all embodiments.

From operation 306B, the method 300B can proceed to operation 308B. At operation 308B, the server computer 112 can obtain (e.g., from the user device 102) the model management data 114. In some embodiments, the server computer 112 can support creation of the model management data 114 via interactions with the user device 102 via a portal or API exposed by the server computer 112 instead of receiving the model management data 114.

From operation 308B, the method 300B can proceed to operation 310B. In operation 310B, the server computer 112 can create the model 116 and/or other structures related therewith such as directories, data structures, diagrams, and the like. From operation 310B, the method 300B can proceed to operation 312B. In operation 312B, the server computer 112 can load the model 116 to the common repository 130 or other data structure or resource. It can be appreciated that in loading the model 116 to the common repository, the server computer 112 can be configured to output the model 116 itself and/or to output model data 128 (e.g., neutral format content such as HTML, XML, or the like) that represents the model 116. It should be understood that this example embodiment is illustrative, and therefore should not be construed as being limiting in any way.

From operation 312B, the method 300B can proceed to operation 314B. The method 300B can end at operation 314B.

Figure 4:
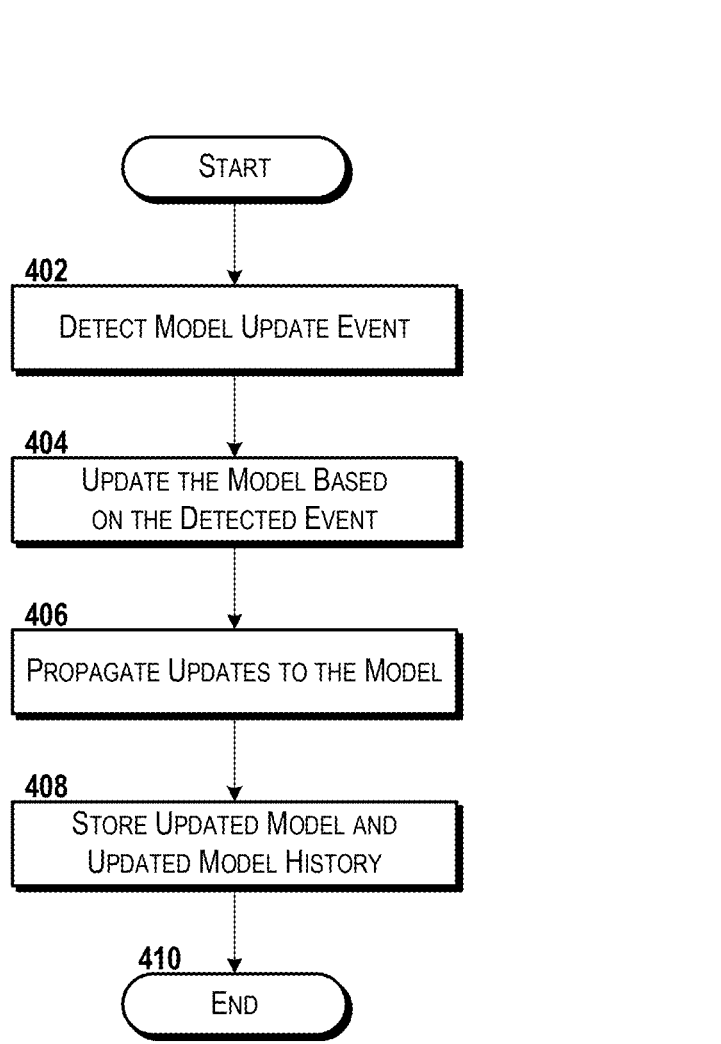
FIG. 4 is a flow diagram showing aspects of a method for enriching, transforming, and updating a model using a model management service, according to an illustrative embodiment of the concepts and technologies described herein.

Turning now to FIG. 4, aspects of a method 400 for enriching, transforming, and updating a model using a model management service will be described in detail, according to an illustrative embodiment. For purposes of illustrating and describing the concepts of the present disclosure, the method 400 is described herein as being performed by the server computer 112 via execution of one or more software modules such as, for example, the model management service 110. It should be understood that additional and/or alternative devices and/or network nodes can provide the functionality described herein via execution of one or more modules, applications, and/or other software including, but not limited to, the model management service 110. Thus, the illustrated embodiments are illustrative, and should not be viewed as being limiting in any way.

The method 400 begins at operation 402. At operation 402, the server computer 112 can detect a model update event. According to various embodiments of the concepts and technologies disclosed herein, the model update event can include a transformation request, a job aid update, or the like.

In some embodiments, for example, a transformation operation can be performed in operation 402. For example, an event can be configured to extract one or more assets 124 from one or more asset catalogs 126 and the meta data associated with the one or more assets 124 can be transformed for inclusion in/modification of the model 116. This can be the case across platforms and/or languages and the model 116 can be updated accordingly.

In another contemplated embodiment, a job aid update by a system or actor can prompt the model management service 110 to update the model 116. The model management service 110 can be configured to listen for events (e.g., changes to job aids), and upon detecting any such update, to prompt an update or enrichment in the model 116 (and optionally to create a history event for adding to the model history 132) such as modeling one or more concepts in the job aid, updating one or more diagrams, or the like. It should be understood that this example embodiment is illustrative, and therefore should not be construed as being limiting in any way. Other types of update events can be detected by the model management service 110 as illustrated and described herein. As such, the above examples are illustrative and should not be construed as being limiting in any way.

From operation 402, the method 400 can proceed to operation 404. At operation 404, the server computer 112 can update the model based on the detected update event. According to various embodiments of the concepts and technologies disclosed herein, the model management service 110 can be configured to obtain an asset 124 from an asset catalog 126, and to incorporate the asset 124 (e.g., a representation of certain processes, systems, flows, or the like) into the model 116. Thus, it can be appreciated that the assets 124 can represent portions of systems, flows, processes, methods, or the like; whereas the model 116 can represent, in some embodiments, the entire system, flow, process, method or the like (of which the asset 124 can represent a component or portion). It should be understood that this example embodiment is illustrative, and therefore should not be construed as being limiting in any way.

In some embodiments, the server computer 112 can also be configured to update the model 116 based on the job aid change. Thus, for example, if flow, process, system, device, or the like has been changed by the job aid change, the server computer 112 (e.g., via execution of the model management service 110) can be configured to identify the changes to make those changes to the model 116 to reflect the updated job aid. It should be understood that this example embodiment is illustrative, and therefore should not be construed as being limiting in any way.

Other types of updates can be made to the models 116 in various embodiments of the concepts and technologies disclosed herein. As such, the above examples are illustrative of only some contemplated embodiments. As such, the above examples are illustrative and should not be construed as being limiting in any way.

From operation 404, the method 400 can proceed to operation 406. At operation 406, the server computer 112 can update the model 116 and create an associated model history event. According to various embodiments of the concepts and technologies disclosed herein, the server computer 112 can be configured to obtain a past version of the model 116 and a new version of the model 116. The server computer 112 can identify each component of each of the models 116 and compare the models 116. Any differences between the models 116 can be tracked and a change event can be created, for example, a data flag that specifies that a change to the model 116 occurred at such-and-such a time by such-and-such a user or device. It should be understood that this example embodiment is illustrative, and therefore should not be construed as being limiting in any way.

From operation 406, the method 400 can proceed to operation 408. At operation 408, the server computer 112 can store the updated model 116 and the updated model history 132. Thus, the new model 116 can be stored with the old model 116 and the events created by the server computer 112 can be stored as well. It should be understood that this example embodiment is illustrative, and therefore should not be construed as being limiting in any way.

From operation 408, the method 400 can proceed to operation 410. The method 400 can end at operation 410.

Figure 5:
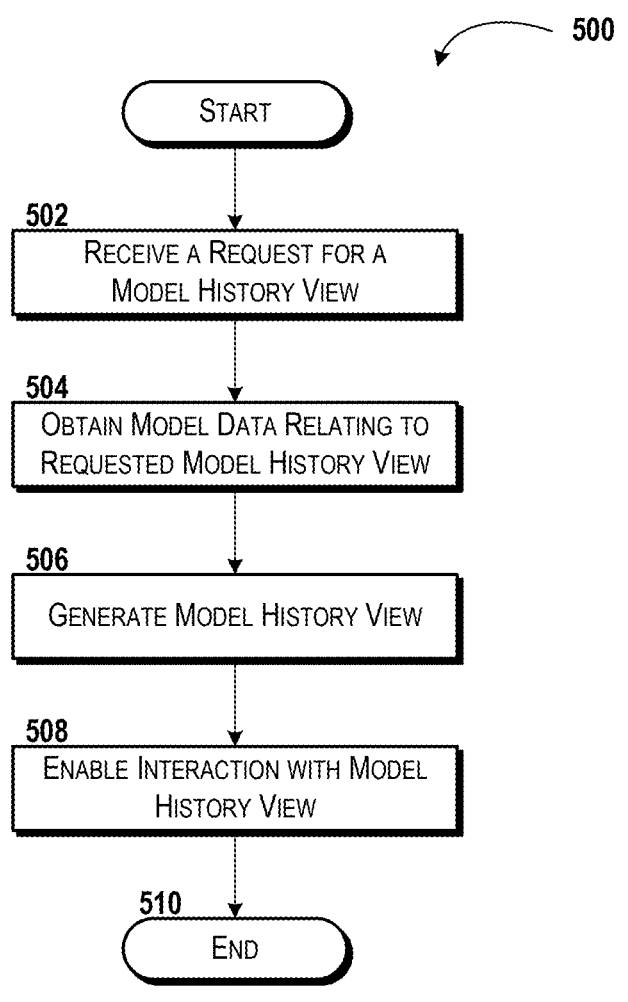
FIG. 5 is a flow diagram showing aspects of a method for viewing and interacting with a model history using a model management service, according to an illustrative embodiment of the concepts and technologies described herein.

Turning now to FIG. 5, aspects of a method 500 for viewing and interacting with a model history using a model management service will be described in detail, according to an illustrative embodiment. For purposes of illustrating and describing the concepts of the present disclosure, the method 500 is described herein as being performed by the server computer 112 via execution of one or more software modules such as, for example, the model management service 110. It should be understood that additional and/or alternative devices and/or network nodes can provide the functionality described herein via execution of one or more modules, applications, and/or other software including, but not limited to, the model management service 110. Thus, the illustrated embodiments are illustrative, and should not be viewed as being limiting in any way.

The method 500 begins at operation 502. At operation 502, the server computer 112 can receive a request for a model history view (e.g., a model history 132 associated with a specified model 116). According to various embodiments of the concepts and technologies disclosed herein, the server computer request received in operation 502 can correspond to a request from one or more of the user devices 102, in some embodiments. In some embodiments, the server computer 112 can receive a request to view a model 116 and/or a model history view (e.g., a view of a model history 132 with one or more links or embedded files representing iterations of the models 116 and/or related files such as diagrams, structures, code 120, and the like). It should be understood that this example embodiment is illustrative, and therefore should not be construed as being limiting in any way.

From operation 502, the method 500 can proceed to operation 504. At operation 504, the server computer 112 can obtain model data 128 relating to the requested model history view (e.g., the model history 132 relating to the model 116 and/or relating to the model history 132 associated with the model 116). In response to detecting or receiving the request, the server computer 112 can be configured to identify the model 116 (associated with the requested model 116 and/or requested model history 132) and obtain model data 128 associated with the identified model 116 and/or model history 132. In various embodiments of the concepts and technologies disclosed herein, the server computer 112 can obtain the model data 128 from the common repository 130 and/or other data storage resources or structures.

From operation 504, the method 500 can proceed to operation 506. At operation 506, the server computer 112 can generate a model history view. The server computer 112 can be configured to generate, based on the model data 128, a model history view. The model history view can include renderable data that can be provided to one or more users, devices, or entities such as the user devices 102 for viewing and/or interacting with at the user devices 102. The model history views can provide a graphical representation of the model history 132 and one or more models 116 represented in the model history 132. Thus, embodiments of the concepts and technologies disclosed herein can enable viewing of an evolution of a model 116 during its life cycle from creation to a most recent iteration, and can enable access to associated models 116 and/or to related data such as diagrams, structures, or the like across the life cycle events. It should be understood that this example embodiment is illustrative, and therefore should not be construed as being limiting in any way.

From operation 506, the method 500 can proceed to operation 508. At operation 508, the server computer 112 can enable interactions with the model history view. The server computer 112 can enable interactions with the model history view and provide updated iterations of the model history view at appropriate times in various embodiments. Operation 508 can include the server computer 112 exposing the model history view to the user or other entity (e.g., the user device 102) to enable modifications and/or interactions such as viewing model 116 and/or model components, modifying models 116 and/or model components, or the like. Changes can be saved and included in the model histories 132. It should be understood that this example embodiment is illustrative, and therefore should not be construed as being limiting in any way.

From operation 508, the method 500 can proceed to operation 510. The method 500 can end at operation 510.

Figure 6A:
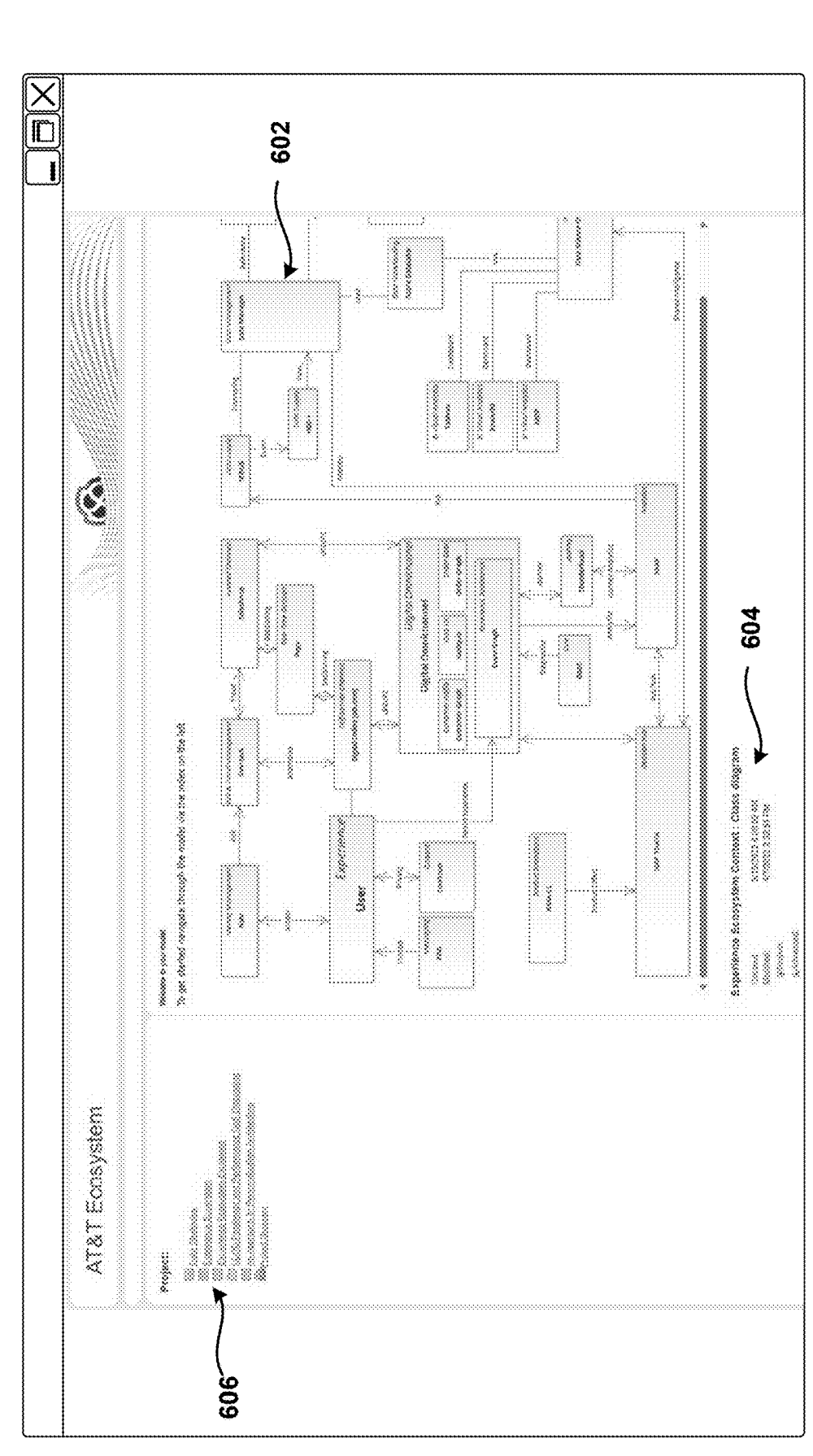
FIGS. 6A-6C are user interface diagrams showing various screen displays showing interacting with a model history view, according to some illustrative embodiments of the concepts and technologies described herein.
Figure 6B:
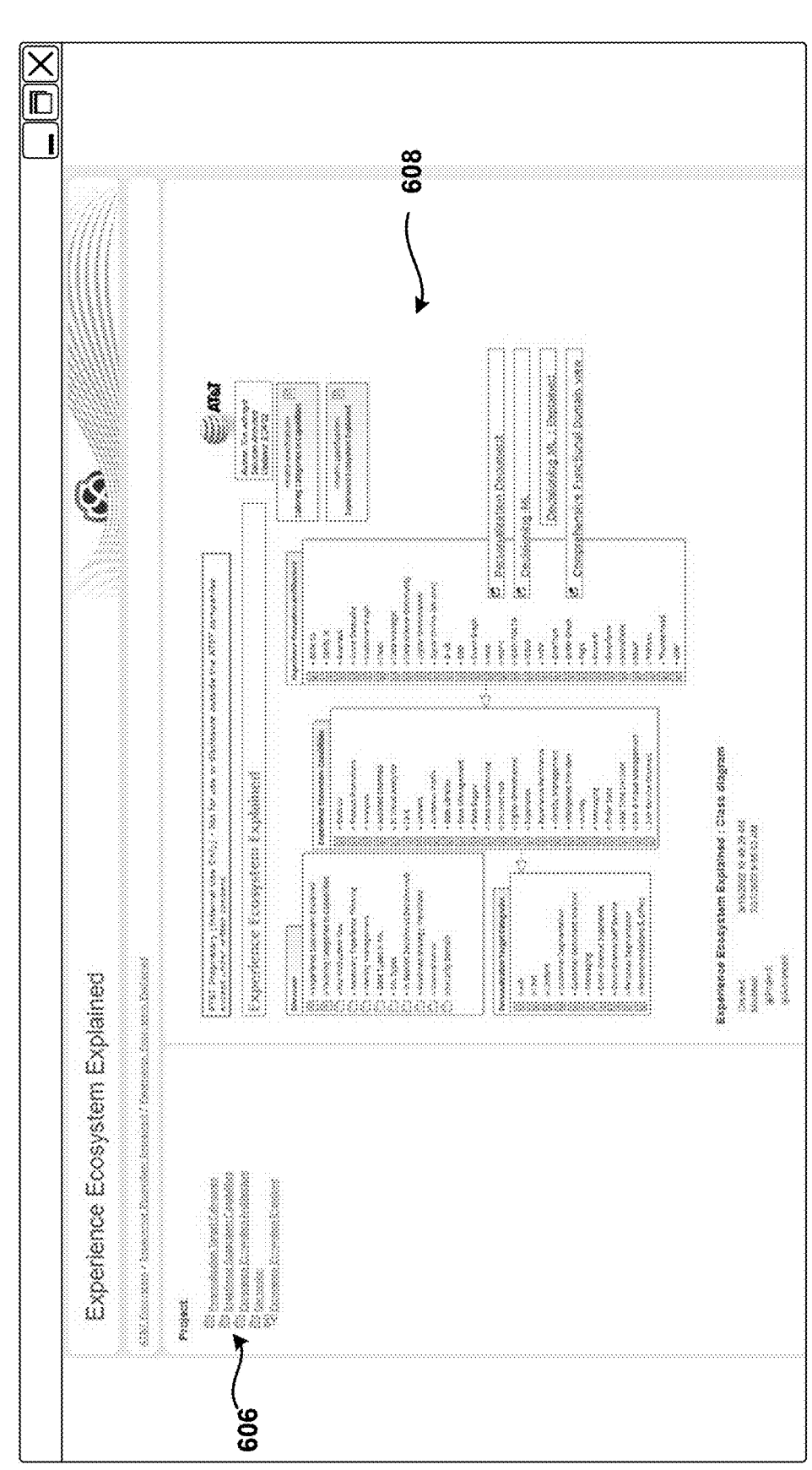
Figure 6C:
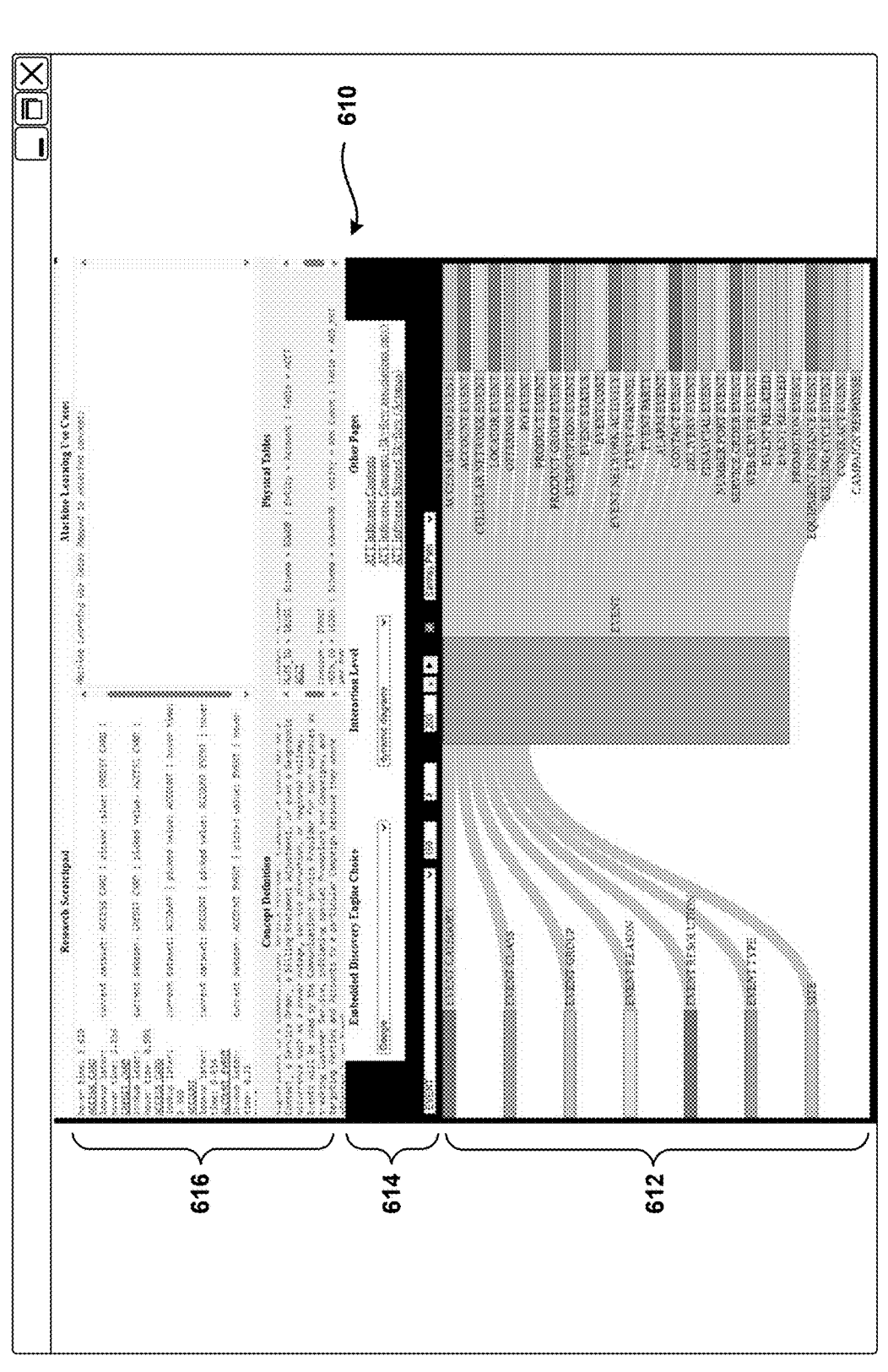

FIGS. 6A-6C are user interface ("UI") diagrams showing aspects of some example UIs for using and/or interacting with a model management service 110 and/or the model management application 108, according to some illustrative embodiments. FIG. 6A shows an illustrative screen display 600A. According to some embodiments of the concepts and technologies described herein, the screen display 600A can be generated by a device such as the user device 102 via interactions with the model management service 110 and/or the model management application 108. In particular, according to various embodiments, the user device 102 can generate the screen display 600A and/or other screen displays in conjunction with and/or based upon interactions with the model management application 108 described herein, which can be configured to render the screen display 600A by rendering data generated at the user device 102 and/or using data provided by the model management service 110 (e.g., the model management data 114). It should be appreciated that the UI diagram illustrated in FIG. 6A is illustrative of one contemplated example of the UIs that can be generated and/or displayed in accordance with the concepts and technologies disclosed herein, and therefore should not be construed as being limited in any way.

According to various embodiments, the screen display 600A can be presented, for example, when a user or other entity requests a model history and/or model view as illustrated and described herein. Because the screen display 600A illustrated in FIG. 6A can be displayed at additional and/or alternative times, it should be understood that these examples are illustrative and therefore should not be construed as being limiting in any way.

The screen display 600A can include various menus and/or menu options (not shown in FIG. 6A). The screen display 600A also can include a model view window 602. The model view window 602 can be configured to present one or more components of a model 116 such as, for example, a diagram (as shown in FIG. 6A), or the like. The model view window 602 can include various types of data and/or information that can be included such as, for example, a model history indicator 604 that can provide information regarding the model creation date, model modification data, and/or other history events as illustrated and described herein with reference to the model histories 132. Thus, as illustrated and described herein, the model view window 602 can provide a view of the model 116 and the model history 132 (or a portion thereof) in some embodiments. It should be understood that this example embodiment is illustrative, and therefore should not be construed as being limiting in any way.

The model view window 602 also can include a model navigation menu 606 that relates to the model 116. As shown in the example embodiment illustrated in FIG. 6A, the model navigation menu 606 can provide links to other components of the model 116 such as, for example, definitions associated with the model 116 and/or the model and/or model history display, other version of the model 116 and/or model components, etc. It should be understood that the illustrated menu 606 is illustrative, and that the menu 606 can include additional and/or alternative information as illustrated and described herein. It should be understood that this example is illustrative and therefore should not be construed as being limiting in any way. Because additional or alternative controls can be included in the model view window 602, it should be understood that the example embodiment shown in FIG. 6A is illustrative and therefore should not be construed as being limiting in any way.

FIG. 6B shows an illustrative screen display 600B. According to some embodiments of the concepts and technologies described herein, the screen display 600B can be generated by a device such as the user device 102 via interactions with the model management service 110 and/or the model management application 108. In particular, according to various embodiments, the user device 102 can generate the screen display 600B and/or other screen displays in conjunction with and/or based upon interactions with the model management application 108 described herein, which can be configured to render the screen display 600B by rendering data generated at the user device 102 and/or using data provided by the model management service 110 (e.g., the model management data 114). It should be appreciated that the UI diagram illustrated in FIG. 6B is illustrative of one contemplated example of the UIs that can be generated and/or displayed in accordance with the concepts and technologies disclosed herein, and therefore should not be construed as being limited in any way.

According to various embodiments, the screen display 600B can be presented, for example, when a user or other entity selects an option to view definitions from the menu 606 shown in the screen display 600A of FIG. 6A. Because the screen display 600B illustrated in FIG. 6B can be displayed at additional and/or alternative times, it should be understood that these examples are illustrative and therefore should not be construed as being limiting in any way.

The screen display 600B can include various menus and/or menu options (not shown in FIG. 6B). The screen display 600B also can include a model explanation view 608. The model explanation view 608 can be configured to present one or more documents and/or links explaining various aspects of the model 116 such as, for example, documents with definitions, process and/or system flows, and the like. The model explanation view 608 can include various types of data and/or information that can be included such as, for example, documents, links to web pages, links to online resources, and the like. Thus, as illustrated and described herein, the model explanation view 608 can provide almost any sort of information that can explain the model 116 and the model history 132 (or a portion thereof) in some embodiments. It should be understood that this example embodiment is illustrative, and therefore should not be construed as being limiting in any way. Because additional or alternative controls can be included in the model explanation view 608, it should be understood that the example embodiment shown in FIG. 6B is illustrative and therefore should not be construed as being limiting in any way.

FIG. 6C shows an illustrative screen display 600C. According to some embodiments of the concepts and technologies described herein, the screen display 600C can be generated by a device such as the user device 102 via interactions with the model management service 110 and/or the model management application 108. In particular, according to various embodiments, the user device 102 can generate the screen display 600C and/or other screen displays in conjunction with and/or based upon interactions with the model management application 108 described herein, which can be configured to render the screen display 600C by rendering data generated at the user device 102 and/or using data provided by the model management service 110 (e.g., the model management data 114). It should be appreciated that the UI diagram illustrated in FIG. 6C is illustrative of one contemplated example of the UIs that can be generated and/or displayed in accordance with the concepts and technologies disclosed herein, and therefore should not be construed as being limited in any way.

According to various embodiments, the screen display 600C can be presented, for example, when a user or other entity selects an option to view a model history 132 associated with the model 116. Because the screen display 600C illustrated in FIG. 6C can be displayed at additional and/or alternative times, it should be understood that these examples are illustrative and therefore should not be construed as being limiting in any way.

The screen display 600C can include various menus and/or menu options (not shown in FIG. 6C). The screen display 600C also can include a model history details view 610. The model history details view 610 can be configured to present one or more aspects of a model history 132 such as a list of events 612, various menu controls 614, and another section 616 of relevant information relating to the model 116 and/or the model history 132. The model history details view 610 can include various types of data and/or information that can be included such as, for example, documents, links to web pages, links to online resources, and the like, as well as detailed information relating to the history of the model 116 and relevant information relating thereto. Thus, as illustrated and described herein, the model history details view 610 can provide almost any sort of information that can explain the model 116 and the model history 132 (or a portion thereof) in some embodiments. It should be understood that this example embodiment is illustrative, and therefore should not be construed as being limiting in any way. Because additional or alternative controls can be included in the model history details view 610, it should be understood that the example embodiment shown in FIG. 6C is illustrative and therefore should not be construed as being limiting in any way.

Figure 7A:
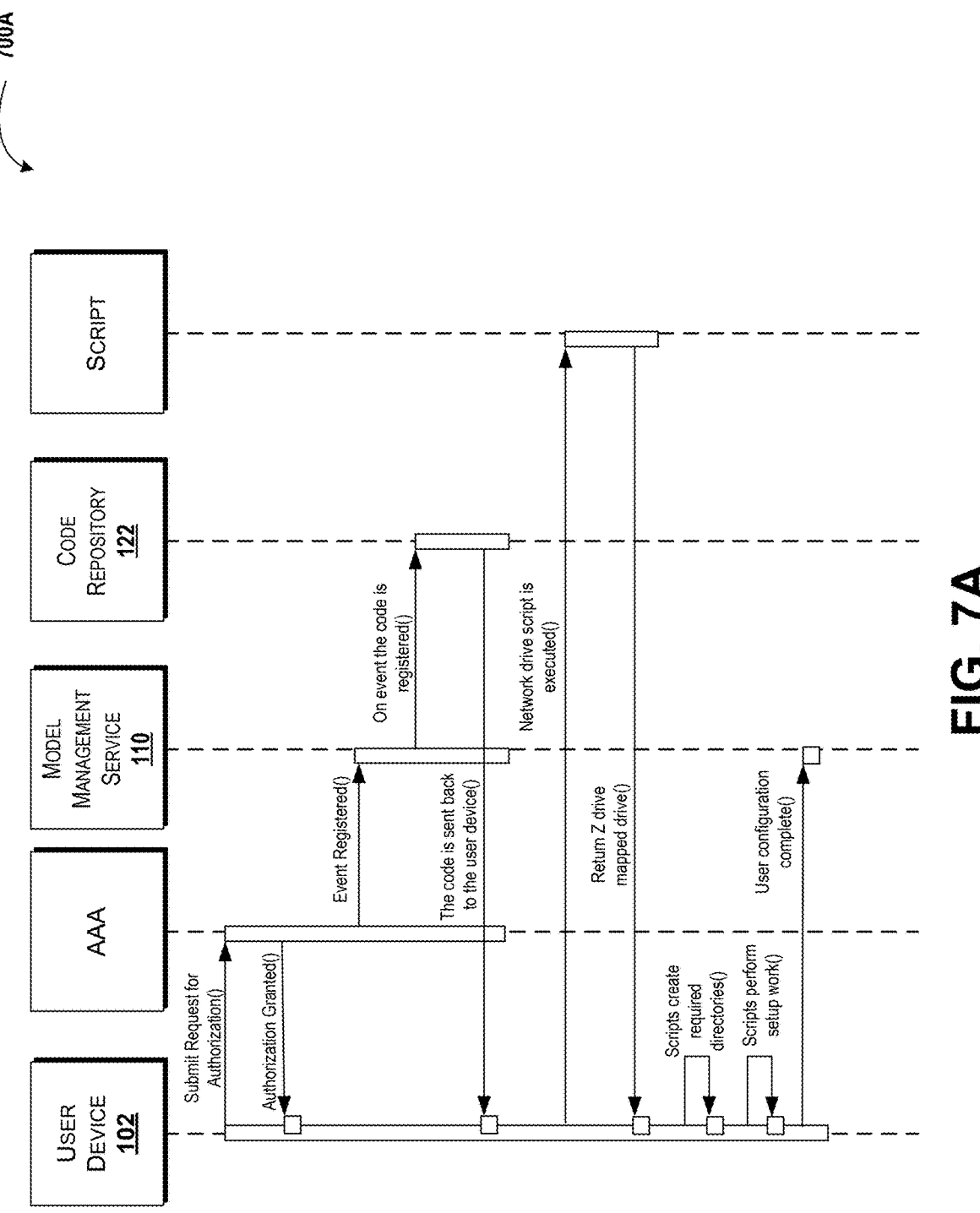

Turning now to FIGS. 7A-7H, some example call flow diagrams illustrating additional aspects of the concepts and technologies disclosed herein for creating, storing modifying, and interacting with a model using a model management service will be described. FIG. 7A illustrates an example call flow diagram showing a process 700A for preprocessing access and artifacts for a model 116. This example process 700A can be performed to enable an isolated a system or actor (e.g., the user device 102A alone and/or in cooperation with a model management service 110) that is responsible for modeling to share created models at some point in the future. Furthermore, the process 700A can enable an acquisition of one or more template models (e.g., the templates 118 shown in FIG. 1) in many different formats. In some embodiments, almost any format can be used where the format is a common extension to the base modeling with common or shared end-user decorations of models for publication in neutral job aids by commonly understood user-defined properties. It can be appreciated with reference to FIG. 7A that having common template models (e.g., the templates 118) with common extensions to the base modeling can enable people without advanced modeling tool knowledge to engineer and update the models 116. Furthermore, such an approach can enable systems and/or AI to absorb well-defined contexts and common processing pipelines. It should be understood that this example embodiment is illustrative, and therefore should not be construed as being limiting in any way.

Figure 7B:
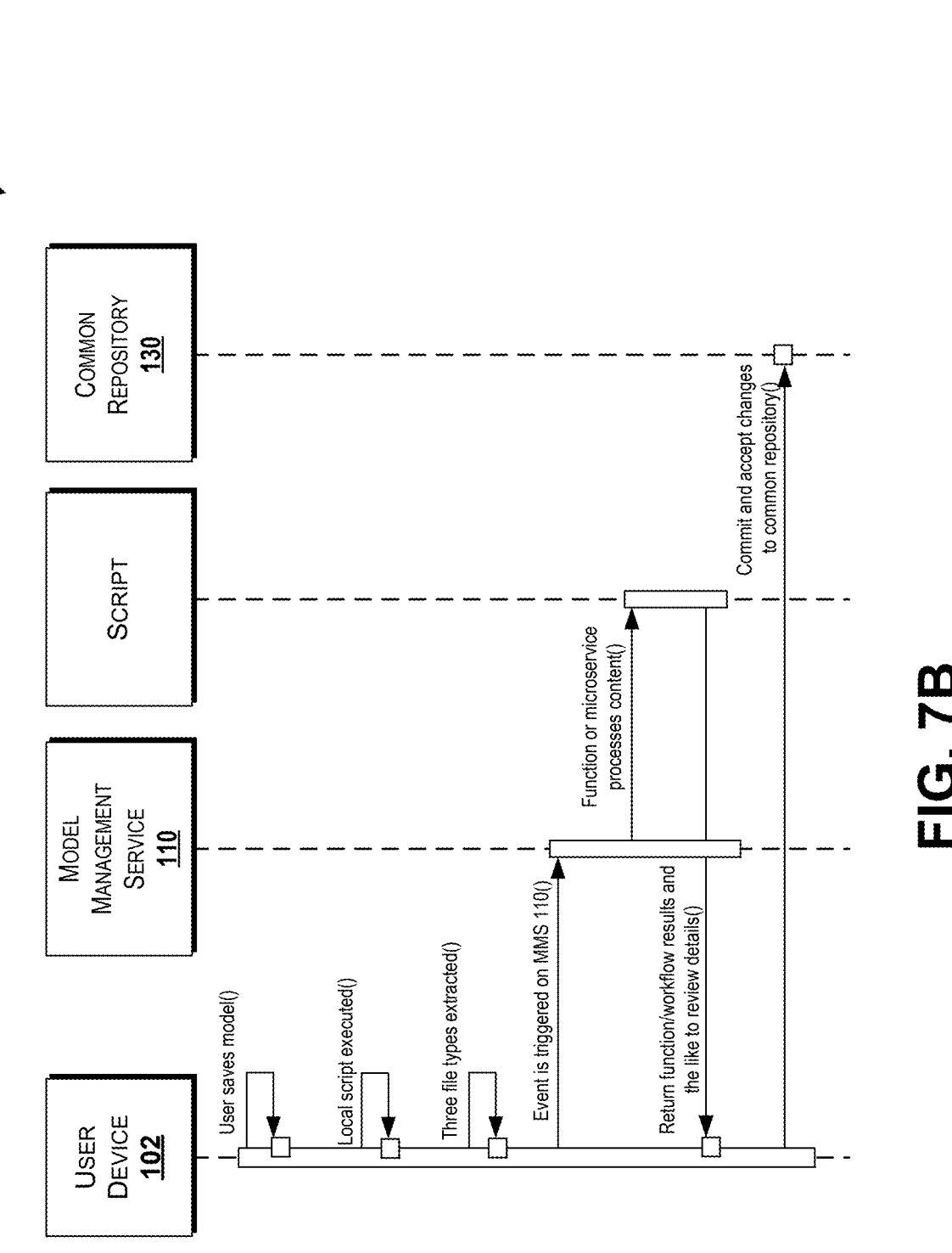

FIG. 7B illustrates an example call flow diagram showing a process 700B for preprocessing model extraction. This example process 700B can be performed to enable a system or actor (e.g., the user device 102A alone and/or in cooperation with a model management service 110) to save a local model and extra neutral format content to be shared for external viewing (e.g., HTML reports, XML files, etc.) and for additional processing and/or automated processing. Furthermore, the process 700B can be performed in an environment that can support neutral content (e.g., XML or XMI) for common back-end processing of content in standards such as Open Data Standard, Open API, Open AI, or the like, via automation functions and/or providing the output to a cloud repository such as the common repository 130. Such processes can be enabled by way of drive mapping without concern for the vendor-specific model binary format for tools such as ERWIN (i.e., the data modeling platform known as "ERWIN"), Sparx EA (e.g., the Enterprise Architect and/or other families of modeling and architecture tools from SPARX), or the like. It should be understood that this example embodiment is illustrative, and therefore should not be construed as being limiting in any way.

Figure 7C:
Figure 7C:
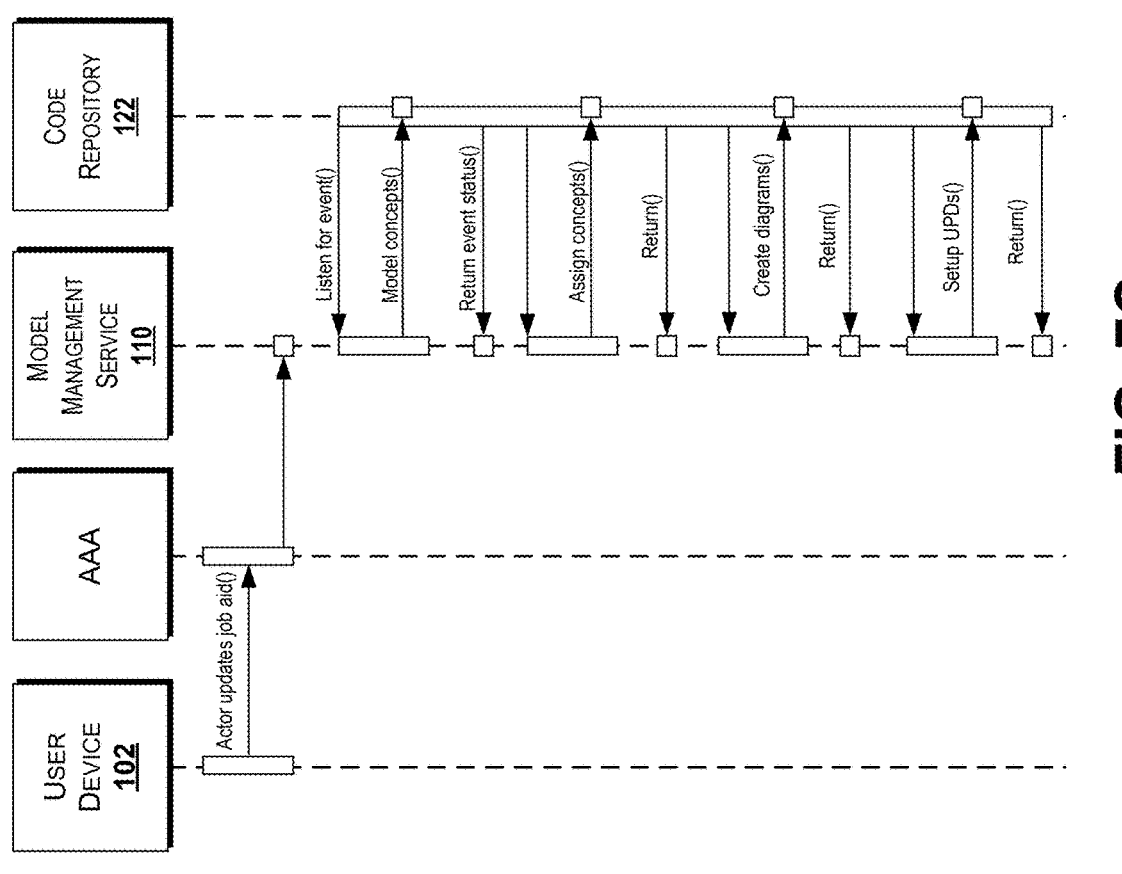

FIG. 7C illustrates an example call flow diagram showing a process 700C for enriching a model 116. This example process 700C can be performed to enable a system or actor (e.g., the user device 102A alone and/or in cooperation with a model management service 110) to update a model 116 (e.g., a model 116 stored in the common repository 130) by updating a job aid. For example, a spreadsheet (e.g., a MICROSOFT EXCEL spreadsheet or GOOGLE SHEETS spreadsheet) that interacts with events and triggers the repository to update concepts, contexts, or other content in the cloud and/or cloud model repository (e.g., the common repository) can trigger a model enrichment process when updated. FIG. 7C illustrates an example process 700C for such an update. It should be understood that this example embodiment is illustrative, and therefore should not be construed as being limiting in any way.

Figure 7D:
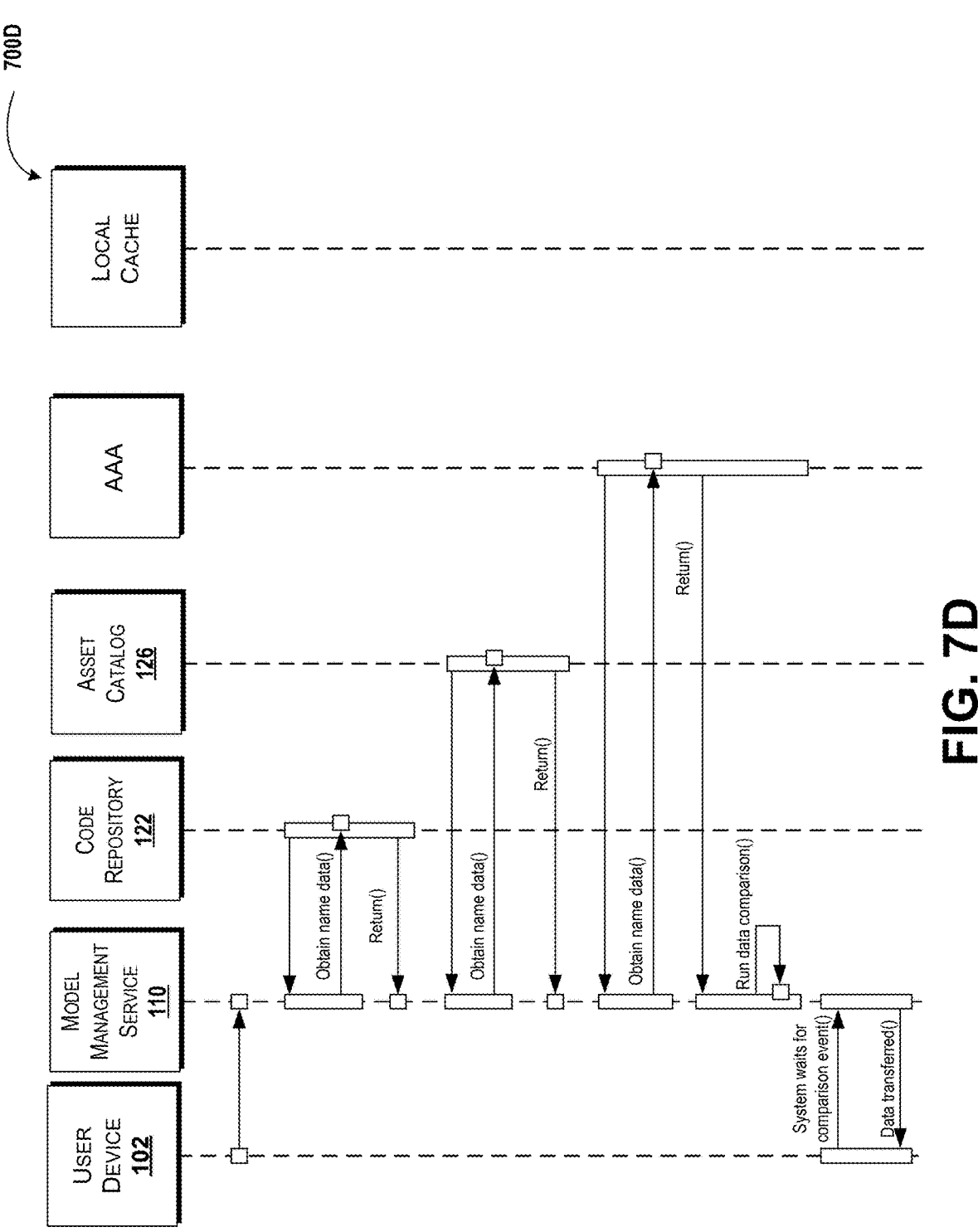

FIG. 7D illustrates an example call flow diagram showing a process 700D for multi-system rationalization (e.g., propagating updates to the model 116 and/or other systems or catalogs such as asset catalog 126, the code repository 122, and/or the common repository 130). This example process 700D can be performed to enable a system or actor (e.g., the user device 102A alone and/or in cooperation with a model management service 110) to update code and model repositories (e.g., the code repository 122 and the common repository 130) to update any number of models 116 and/or related files (e.g., assets 124 in the asset catalog 126, code 120 in the code repository 122, models 116, model data 128, and/or model histories 132 in the common repository 130, or the like). Furthermore, the process 700D can trigger updates to events (e.g., model history events and/or model histories 132), the templates 118, and/or other data catalogs, feature stores, event catalogs, and/or API/service catalogs. It should be understood that this example embodiment is illustrative, and therefore should not be construed as being limiting in any way.

Figure 7E:
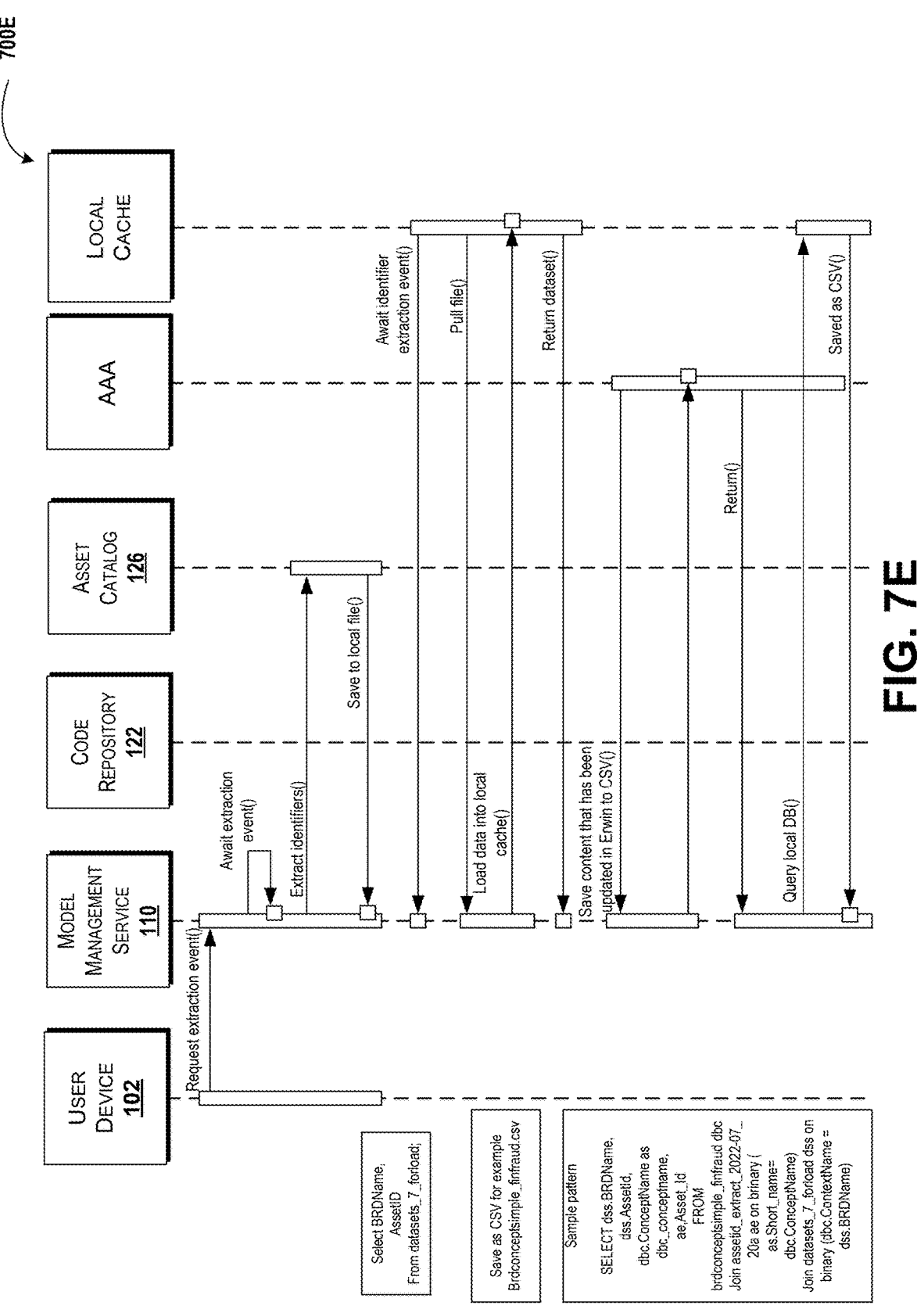

FIG. 7E illustrates an example call flow diagram showing a process 700E for performing target transformation for a model 116. This example process 700E can be performed to enable a system or actor (e.g., the user device 102A alone and/or in cooperation with a model management service 110) to trigger an event to extra well-known named assets 124 in the asset catalog 126 (or multiple asset catalogs 126) and to promote inter-model communication with local and remote caches. In one example implementation of the process 700E, a chosen business-ready dataset (BRD) can be extracted from a cloud-based model repository (e.g., the common repository 130), the code repository 122, and the one or more asset catalogs 126. This extraction can be performed regardless of the models 116 being in different formats (e.g., modeling tool formats and/or binary formats such as ERWIN, Sparx EA, or the like). It should be understood that this example embodiment is illustrative, and therefore should not be construed as being limiting in any way.

Figure 7F:
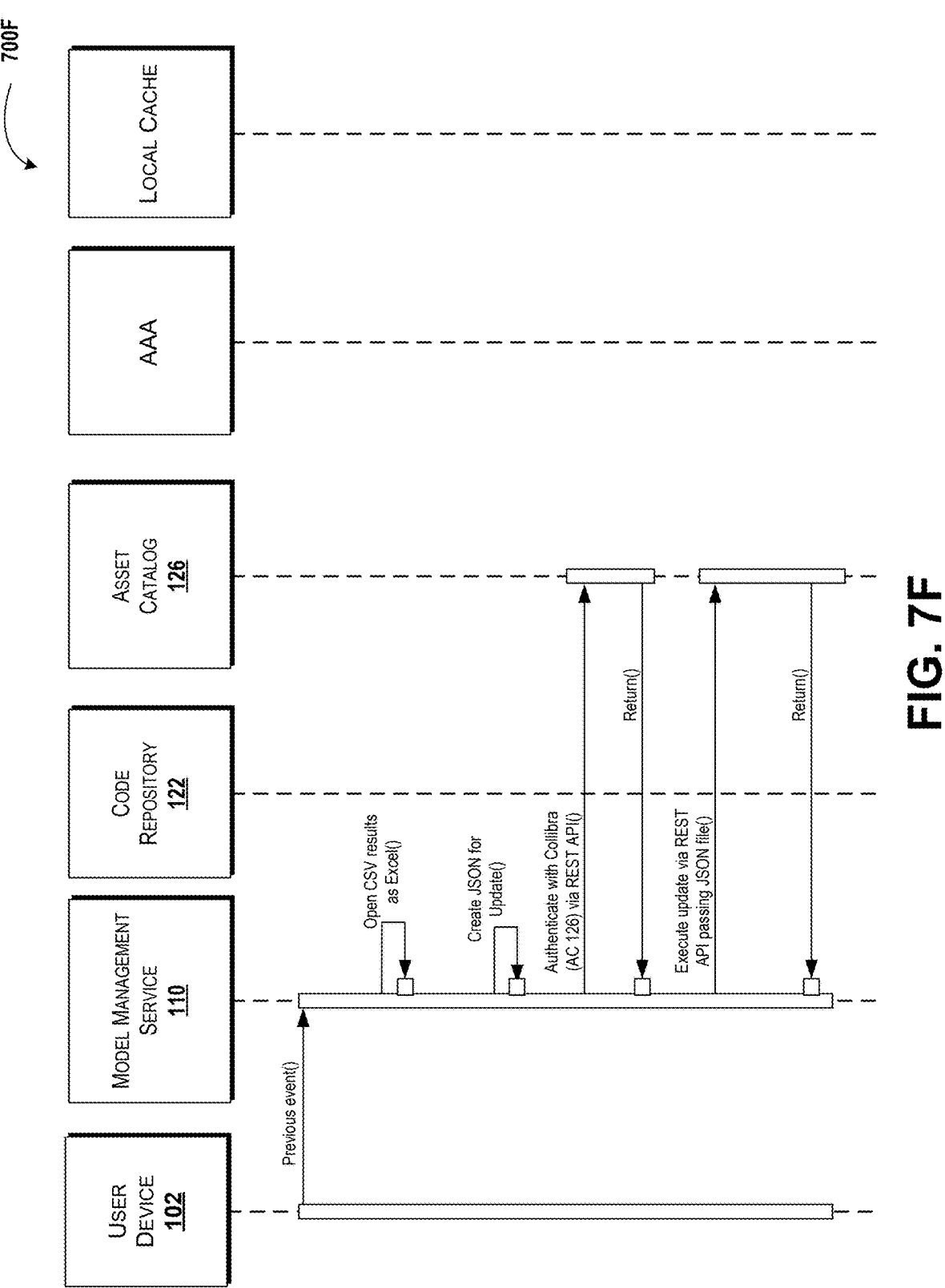

FIG. 7F illustrates an example call flow diagram showing a process 700F for updating various catalogs and/or APIs (e.g., a distributed synchronization). This example process 700F can be performed to generate by a system or actor (e.g., the user device 102A alone and/or in cooperation with a model management service 110) an event to indicate a change or update to a model 116 or a file associated therewith. The model management service 110 can be configured to open CSV results (e.g., if generated at the end of the process 700E illustrated herein), create standard format update based on the CSV results (e.g., a JSON file or the like), and then authenticate with and update (e.g., via RESTful API calls with the asset catalog 126) the asset catalog 126. It should be understood that this example embodiment is illustrative, and therefore should not be construed as being limiting in any way.

Figure 7H:
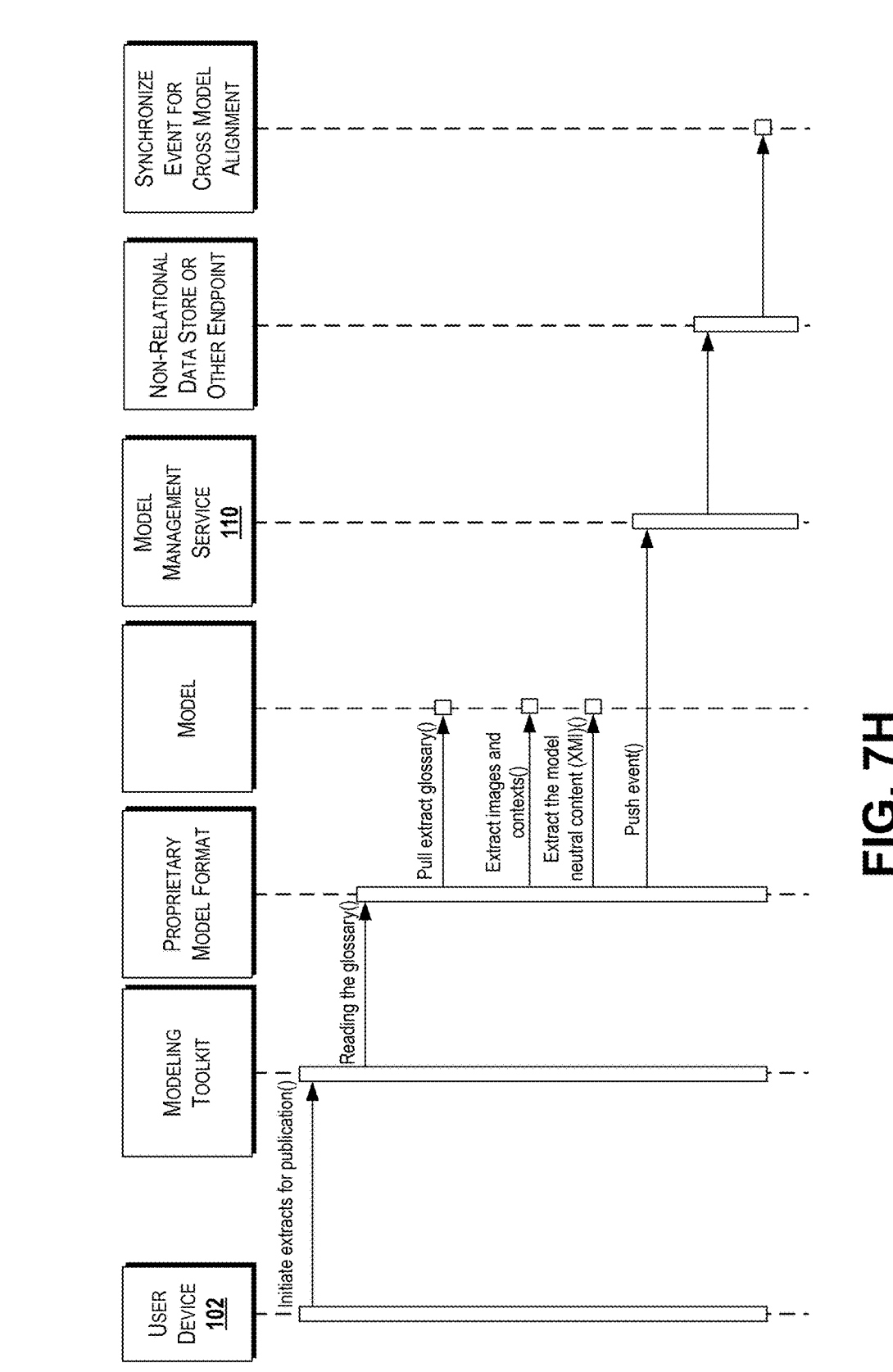

FIGS. 7G-7H illustrate example processes 700G and 700H for post-processing operations that can be performed in accordance with the concepts and technologies disclosed herein. The processes 700G and 700H can be triggered by a system or actor (e.g., the user device 102A alone and/or in cooperation with a model management service 110) or other entities. It should be understood that this example embodiment is illustrative, and therefore should not be construed as being limiting in any way.

Figure 8:
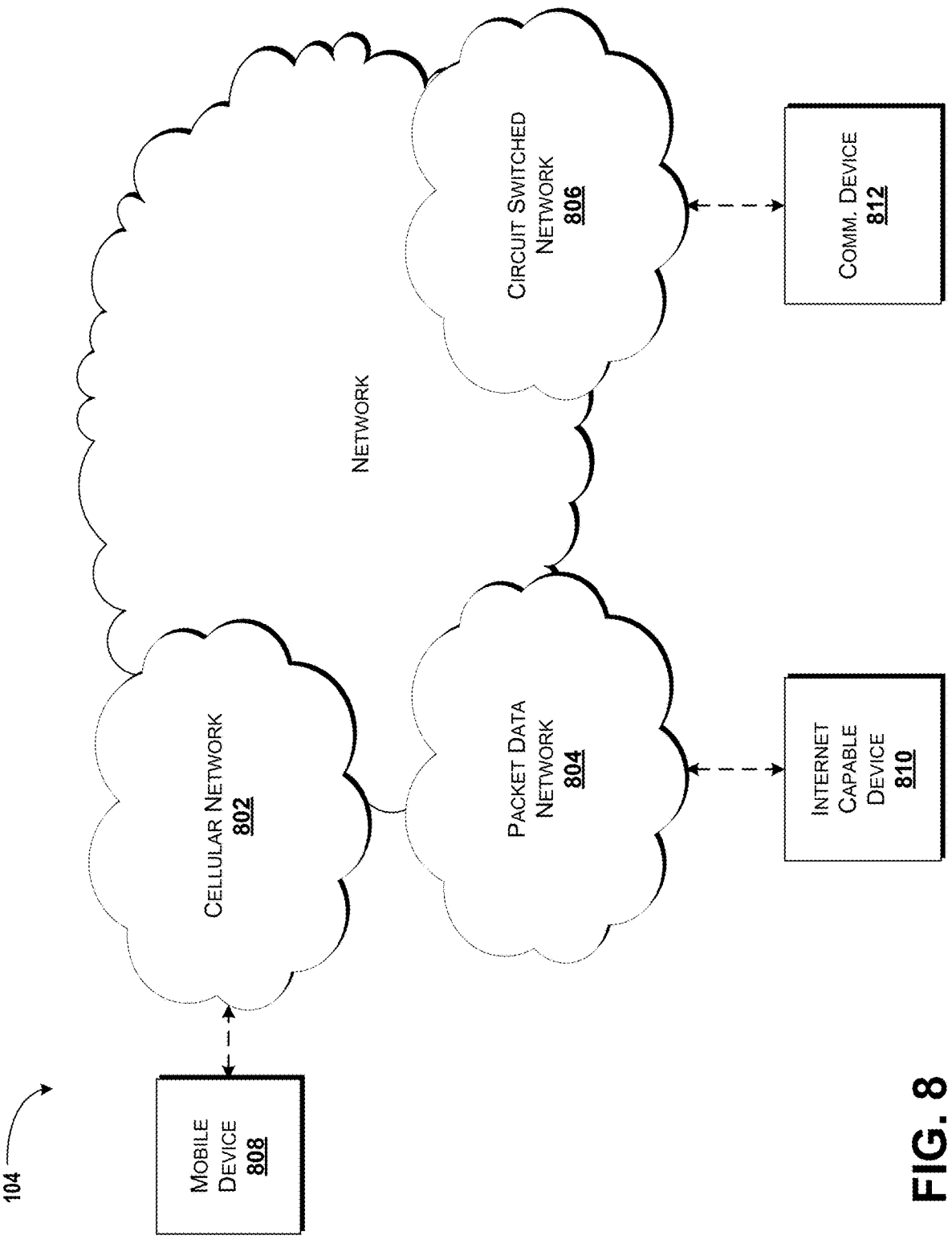
FIG. 8 schematically illustrates a network, according to an illustrative embodiment of the concepts and technologies described herein.

Turning now to FIG. 8, additional details of the network 104 are illustrated, according to an illustrative embodiment. The network 104 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs"); mobile management entities ("MMEs"); access and mobility management functions ("AMFs"); authentication server functions ("AUSFs"), network slice selection functions ("NSSFs"); network exposure functions ("NEFs"); policy control functions ("PCFs"); and various other functions in the user and control planes such as, for example, user plane functions ("UPFs"), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 802 also can include various interfaces between various components, as is generally understood. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards, 5G mobile communications standards, 6G mobile communication standards, other mobile communications standards, and evolved and future mobile communications standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 104 is used to refer broadly to any combination of the networks 802, 804, 806. It should be appreciated that substantially all of the functionality described with reference to the network 104 can be performed by the cellular network 802, the packet data network 804, and/or the circuit switched network 806, alone or in combination with other networks, network elements, and the like.

Figure 9:
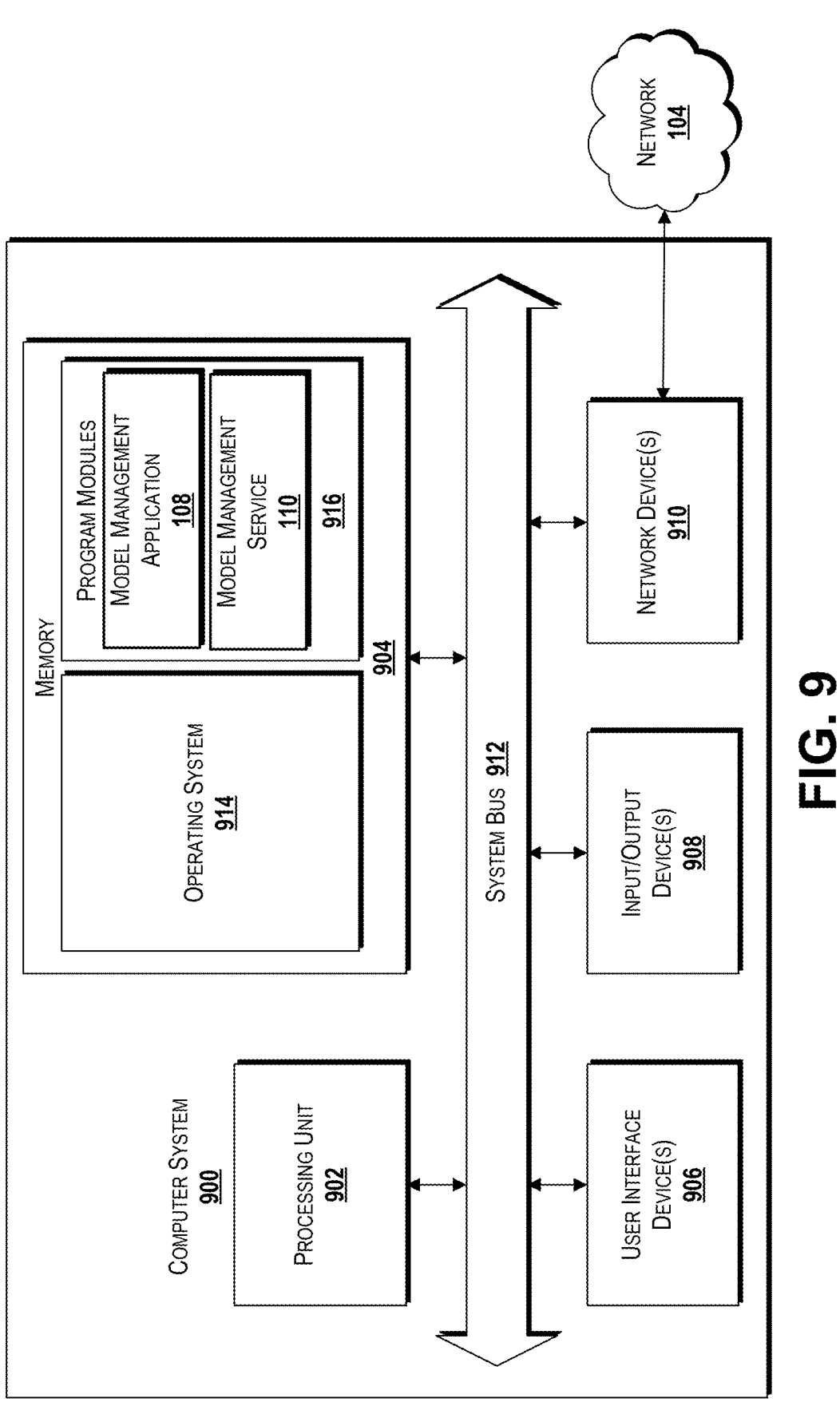
FIG. 9 is a block diagram illustrating an example computer system configured to provide model creation and management using a model management service, according to some illustrative embodiments of the concepts and technologies described herein.

FIG. 9 is a block diagram illustrating a computer system 900 configured to provide the functionality described herein for providing model creation and management using a model management service, in accordance with various embodiments of the concepts and technologies disclosed herein. As such, it can be appreciated that the user devices 102 and/or the server computer 112 can have an architecture similar to the computer system 900 shown in FIG. 9 in some embodiments, though this is not necessarily the case. The computer system 900 includes a processing unit 902, a memory 904, one or more user interface devices 906, one or more input/output ("I/O") devices 908, and one or more network devices 910, each of which is operatively connected to a system bus 912. The system bus 912 can enable bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 916 may include various software and/or program modules described herein. In some embodiments, for example, the program modules 916 include the model management application 108 and/or the server computer 112. This and/or other programs can be embodied in computer-readable media containing instructions that, when executed by the processing unit 902, perform one or more of the methods 200, 300A, 300B. 400, 500 described in detail above with respect to FIGS. 2-5 and/or other functionality as illustrated and described herein. It can be appreciated that, at least by virtue of the instructions embodying the methods 200, 300A, 300B, 400, 500, and/or other functionality illustrated and described herein being stored in the memory 904 and/or accessed and/or executed by the processing unit 902, the computer system 900 is a special-purpose computing system that can facilitate providing the functionality illustrated and described herein. According to embodiments, the program modules 916 may be embodied in hardware, software, firmware, or any combination thereof. Although not shown in FIG. 9, it should be understood that the memory 904 also can be configured to store the model management data 114, the models 116, the templates 118, the code 120, the assets 124, the model data 128, the model histories 132, the metadata 134, and/or other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network, such as the network 104. Examples of the network devices 910 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 10:
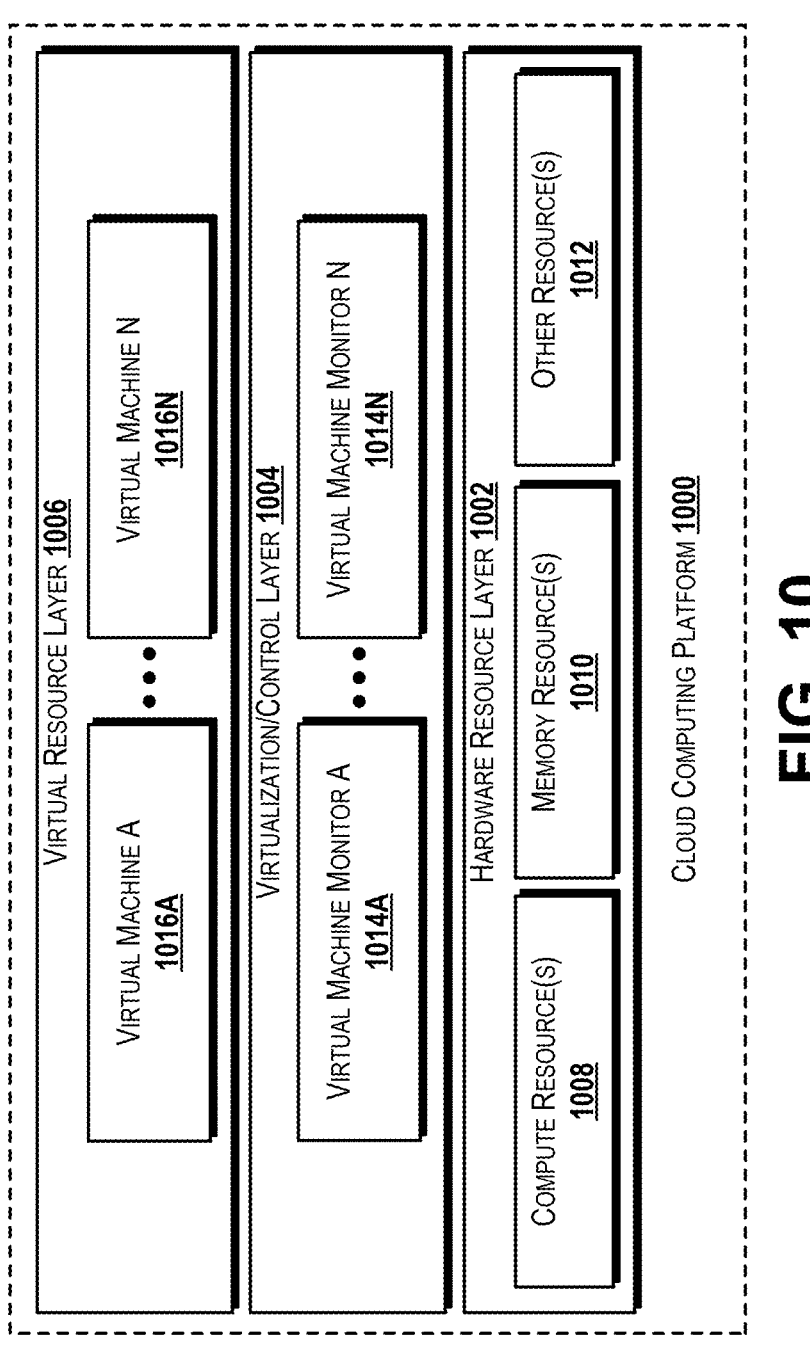
FIG. 10 is a diagram illustrating a computing environment capable of implementing aspects of the concepts and technologies disclosed herein, according to some illustrative embodiments of the concepts and technologies described herein.

FIG. 10 illustrates an illustrative architecture for a cloud computing platform 1000 that can be capable of executing the software components described herein for providing model creation and management using a model management service 110 and/or for interacting with the model management application 108 and/or the model management service 110. Thus, it can be appreciated that in some embodiments of the concepts and technologies disclosed herein, the cloud computing platform 1000 illustrated in FIG. 10 can be used to provide the functionality described herein with respect to the user devices 102, the server computer 112, the code repository 122, the asset catalog 126, the common repository 130, and/or the metadata sources 136.

The cloud computing platform 1000 thus may be utilized to execute any aspects of the software components presented herein. Thus, according to various embodiments of the concepts and technologies disclosed herein, the model management application 108 and/or the model management service 110 can be implemented, at least in part, on or by elements included in the cloud computing platform 1000 illustrated and described herein. Those skilled in the art will appreciate that the illustrated cloud computing platform 1000 is a simplification of but only one possible implementation of an illustrative cloud computing platform, and as such, the illustrated cloud computing platform 1000 should not be construed as being limiting in any way.

In the illustrated embodiment, the cloud computing platform 1000 can include a hardware resource layer 1002, a virtualization/control layer 1004, and a virtual resource layer 1006. These layers and/or other layers can be configured to cooperate with each other and/or other elements of a cloud computing platform 1000 to perform operations as will be described in detail herein. While connections are shown between some of the components illustrated in FIG. 10, it should be understood that some, none, or all of the components illustrated in FIG. 10 can be configured to interact with one another to carry out various functions described herein. In some embodiments, the components are arranged so as to communicate via one or more networks such as, for example, the network 104 illustrated and described hereinabove (not shown in FIG. 10). Thus, it should be understood that FIG. 10 and the following description are intended to provide a general understanding of a suitable environment in which various aspects of embodiments can be implemented, and should not be construed as being limiting in any way.

The hardware resource layer 1002 can provide hardware resources. In the illustrated embodiment, the hardware resources can include one or more compute resources 1008, one or more memory resources 1010, and one or more other resources 1012. The compute resource(s) 1008 can include one or more hardware components that can perform computations to process data, and/or to execute computer-executable instructions of one or more application programs, operating systems, services, and/or other software including, but not limited to, the operating system 106, the model management application 108, and/or the model management service 110 illustrated and described herein.

According to various embodiments, the compute resources 1008 can include one or more central processing units ("CPUs"). The CPUs can be configured with one or more processing cores. In some embodiments, the compute resources 1008 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1008 can include one or more discrete GPUs. In some other embodiments, the compute resources 1008 can include one or more CPU and/or GPU components that can be configured in accordance with a co-processing CPU/GPU computing model. Thus, it can be appreciated that in some embodiments of the compute resources 1008, a sequential part of an application can execute on a CPU and a computationally-intensive part of the application can be accelerated by the GPU. It should be understood that this example is illustrative, and therefore should not be construed as being limiting in any way.

In some embodiments, the compute resources 1008 also can include one or more system on a chip ("SoC") component. It should be understood that an SoC component can operate in association with one or more other components as illustrated and described herein, for example, one or more of the memory resources 1010 and/or one or more of the other resources 1012. In some embodiments in which an SoC component is included, the compute resources 1008 can be or can include one or more embodiments of the SNAP-DRAGON brand family of SoCs, available from QUAL-COMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 1008 can be or can include one or more hardware components arranged in accordance with an ARM architecture, available for license from ARM HOLD-INGS of Cambridge, United Kingdom. Alternatively, the compute resources 1008 can be or can include one or more hardware components arranged in accordance with an x86 architecture, such as an architecture available from INTEL CORPORATION of Mountain View, California, and others. Those skilled in the art will appreciate the implementation of the compute resources 1008 can utilize various computation architectures and/or processing architectures. As such, the various example embodiments of the compute resources

1008 as mentioned hereinabove should not be construed as being limiting in any way. Rather, implementations of embodiments of the concepts and technologies disclosed herein can be implemented using compute resources 1008 having any of the particular computation architecture and/or combination of computation architectures mentioned herein as well as other architectures.

Although not separately illustrated in FIG. 10, it should be understood that the compute resources 1008 illustrated and described herein can host and/or execute various services, applications, portals, and/or other functionality illustrated and described herein. Thus, the compute resources 1008 can host and/or can execute the model management application 108, the model management service 110, and/or other applications or services illustrated and described herein.

The memory resource(s) 1010 can include one or more hardware components that can perform or provide storage operations, including temporary and/or permanent storage operations. In some embodiments, the memory resource(s) 1010 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1008, subject to the definition of "computer storage media" provided above (e.g., as excluding waves and signals per se and/or communication media as defined in this application).

Although not illustrated in FIG. 10, it should be understood that the memory resources 1010 can host or store the various data illustrated and described herein including, but not limited to, the model management data 114, the models 116, the templates 118, the code 120, the assets 124, the model data 128, the model histories 132, the metadata 134, and/or other data, if desired. It should be understood that this example is illustrative, and therefore should not be construed as being limiting in any way.

The other resource(s) 1012 can include any other hardware resources that can be utilized by the compute resources(s) 1008 and/or the memory resource(s) 1010 to perform operations. The other resource(s) 1012 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1002 can be virtualized by one or more virtual machine monitors ("VMMs") 1014A-1014N (also known as "hypervisors;" hereinafter "VMMs 1014"). The VMMs 1014 can operate within the virtualization/control layer 1004 to manage one or more virtual resources that can reside in the virtual resource layer 1006. The VMMs 1014 can be or can include software, firmware, and/or hardware that alone or in combination with other software, firmware, and/or hardware, can manage one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. These abstractions are referred to herein as virtual machines ("VMs"). In the illustrated embodiment, the virtual resource layer 1006 includes VMs 1016A-1016N (hereinafter "VMs 1016").

Based on the foregoing, it should be appreciated that systems and methods for providing model creation and management using a model management service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:

obtaining, via a network connection and from a user device that has authenticated with a model management service, model management data that comprises modeling data that defines a project that is to be modeled, wherein the project comprises a network flow or a process that is performed at the user device;

obtaining, from a code repository and based on the project that is defined by the modeling data, code associated with the project;

identifying, based on the project, scripts that are to be executed by the user device during modeling of the project;

identifying, based on the model management data, a template that is to be applied to the project to generate a model;

providing, to the user device and via the network connection, the template, the code, and the scripts, wherein the user device creates, based on the project, the template, the code, and the scripts, the model by generating a directory, a data structure, and a diagram that describes the project, wherein the user device creates the model in a proprietary format;

obtaining, from the user device, the model in the proprietary format;

converting the model from the proprietary format to a device-agnostic format version of the model;

storing, at a common repository, model data that comprises the device-agnostic format version of the model;

receiving a request for a model history view relating to the model;

obtaining model data and a model history from the common repository, wherein the model data describes the model, and wherein the model history describes lifecycle events associated with the model;

generating the model history view, wherein the model history view depicts model update events associated with the model and versions of the model; and enabling interactions with the model history view by the user device via portal.

2. The system of claim 1, wherein the device-agnostic format version of the model comprises hypertext markup language or extensible markup language.

3. The system of claim 1, wherein the model history comprises data that describes creation of the model and a history of updates and iterations of the model over the history of updates.

4. The system of claim 1, wherein the computer-executable instructions, when executed by the processor, cause the processor to perform operations further comprising:

detecting a model update comprising a request to update the model;

retrieving, from the common repository, the model data;

updating the model based on the model update;

generating a model update event that defines an update to the model;

adding the model update event to the model history, wherein the model history is stored at the common repository; and storing the model update event and an updated model history at the common repository.

5. The system of claim 4, wherein the model update event comprises an addition to the model, and wherein updating the model comprises:

obtaining an asset from an asset catalog, wherein the asset relates to the addition and comprises a portion of the project in a modeling language; and updating the model data associated with the model based on the asset and the model update event.

6. The system of claim 1, wherein the diagram comprises a unified modeling language model.

7. The system of claim 6, wherein the model history view comprises depictions of at least two model update events associated with the model, the model update events being obtained from the model history, and wherein the model history view provides access to at least two versions of the model.

8. A method comprising:

obtaining, via a network connection and at a server computer comprising a processor and from a user device that has authenticated with a model management service, model management data that comprises modeling data that defines a project that is to be modeled, wherein the project comprises a network flow or a process that is performed at the user device;

obtaining, by the processor and from a code repository based on the project that is defined by the modeling data, code associated with the project;

identifying, based on the project, scripts that are to be executed by the user device during modeling of the project;

identifying, by the processor and based on the model management data, a template that is to be applied to the project to generate a model;

providing, by the process and to the user device via the network connection, the template, the code, and the scripts, wherein the user device creates, based on the project, the template, the code, and the scripts, the model by generating a directory, a data structure, and a diagram that describes the project, wherein the user device creates the model in a proprietary format;

obtaining, by the processor and from the user device, the model in the proprietary format;

converting the model from the proprietary format to a device-agnostic format version of the model;

storing, by the processor and at a common repository, model data that comprises the device-agnostic format version of the model;

receiving a request for a model history view relating to the model;

obtaining model data and a model history from the common repository, wherein the model data describes the model, and wherein the model history describes lifecycle events associated with the model;

generating the model history view, wherein the model history view depicts model update events associated with the model and versions of the model; and enabling interactions with the model history view by the user device via portal.

9. The method of claim 8, wherein the device-agnostic format version of the model comprises hypertext markup language or extensible markup language.

10. The method of claim 8, wherein the model history comprises data that describes creation of the model and a history of updates and iterations of the model over the history of updates.

11. The method of claim 8, further comprising:

detecting, by the processor, a model update comprising a request to update the model;

retrieving, by the processor and from the common repository, the model data;

updating, by the processor, the model based on the model update;

generating, by the processor, a model update event that defines an update to the model;

adding, by the processor, the model update event to the model history, wherein the model history is stored at the common repository; and storing, by the processor, the model update event and an updated model history at the common repository.

12. The method of claim 11, wherein the model update event comprises an addition to the model, and wherein updating the model comprises:

obtaining an asset from an asset catalog, wherein the asset relates to the addition and comprises a portion of the project in a modeling language; and updating the model data associated with the model based on the asset and the model update event.

13. The method of claim 8, wherein the diagram comprises a unified modeling language model, wherein the model history view comprises depictions of at least two model update events associated with the model, the model update events being obtained from the model history, and wherein the model history view provides access to at least two versions of the model.

14. A computer storage medium having computer-executable instructions stored thereon that, when executed by a processor, cause the processor to perform operations comprising:

obtaining, via a network connection and from a user device that has authenticated with a model management service, model management data that comprises modeling data that defines a project that is to be modeled, wherein the project comprises a network flow or a process that is performed at the user device;

obtaining, from a code repository and based on the project that is defined by the modeling data, code associated with the project;

identifying, based on the project, scripts that are to be executed by the user device during modeling of the project;

identifying, based on the model management data, a template that is to be applied to the project to generate a model;

providing, to the user device and via the network connection, the template, the code, and the scripts, wherein the user device creates, based on the project, the template, the code, and the scripts, the model by generating a directory, a data structure, and a diagram that describes the project, wherein the user device creates the model in a proprietary format;

obtaining, from the user device, the model in the proprietary format;

converting the model from the proprietary format to a device-agnostic format version of the model;

storing, at a common repository, model data that comprises the device-agnostic format version of the model;

receiving a request for a model history view relating to the model;

obtaining model data and a model history from the common repository, wherein the model data describes the model, and wherein the model history describes lifecycle events associated with the model;

generating the model history view, wherein the model history view depicts model update events associated with the model and versions of the model; and enabling interactions with the model history view by the user device via portal.

15. The computer storage medium of claim 14, wherein the device-agnostic format version of the model comprises hypertext markup language or extensible markup language.

16. The computer storage medium of claim 14, wherein the model history comprises data that describes creation of the model and a history of updates and iterations of the model over the history of updates.

17. The computer storage medium of claim 14, wherein the computer-executable instructions, when executed by the processor, cause the processor to perform operations further comprising:

detecting a model update comprising a request to update the model;

retrieving, from the common repository, the model;

updating the model based on the model update;

generating a model update event that defines an update to the model;

adding the model update event to the model history, wherein the model history is stored at the common repository; and storing the model update event and an updated model history at the common repository.

18. The computer storage medium of claim 17, wherein the model update event comprises an addition to the model, and wherein updating the model comprises:

obtaining an asset from an asset catalog, wherein the asset relates to the addition and comprises a portion of the project in a modeling language; and updating the model data associated with the model based on the asset and the model update event.

19. The computer storage medium of claim 14, wherein the diagram comprises a unified modeling language model.

20. The computer storage medium of claim 19, wherein the model history view comprises depictions of at least two model update events associated with the model, the model update events being obtained from the model history, and wherein the model history view provides access to at least two versions of the model.

* * * * *